(12) United States Patent
Lankalapalli et al.

(10) Patent No.: US 11,853,028 B2
(45) Date of Patent: Dec. 26, 2023

(54) COORDINATE MEASUREMENT SYSTEM WITH AUXILIARY AXIS

(71) Applicant: FARO Technologies, Inc., Lake Mary, FL (US)

(72) Inventors: Kishore Lankalapalli, Sanford, FL (US); Kenneth Steffey, Longwood, FL (US); Keith G. Macfarlane, Lake Mary, FL (US); Paul C. Atwell, Lake Mary, FL (US); Dragos M. Stanescu, Lake Mary, FL (US); John Lucas Creachbaum, Deltona, FL (US); Brent Bailey, Winter Springs, FL (US); Matthew Mogensen, Longwood, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 66 days.

(21) Appl. No.: 17/171,183

(22) Filed: Feb. 9, 2021

(65) Prior Publication Data

US 2021/0165389 A1    Jun. 3, 2021

Related U.S. Application Data

(63) Continuation of application No. 16/364,474, filed on Mar. 26, 2019, now Pat. No. 10,969,760.
(Continued)

(51) Int. Cl.
*G05B 19/401* (2006.01)
*G01B 21/04* (2006.01)
*G01B 11/00* (2006.01)

(52) U.S. Cl.
CPC .......... *G05B 19/401* (2013.01); *G01B 11/007* (2013.01); *G01B 21/047* (2013.01);
(Continued)

(58) Field of Classification Search
CPC .......... H04L 12/40; H04L 2012/40215; G08C 15/06; G05B 19/401; G05B 19/402;
(Continued)

(56) References Cited

U.S. PATENT DOCUMENTS

| 4,534,006 A | 8/1985 | Minucciani et al. |
| 4,836,742 A | 6/1989 | Ishiguro et al. |

(Continued)

FOREIGN PATENT DOCUMENTS

| EP | 2384851 A1 | 11/2011 |
| EP | 2977715 A1 | 1/2016 |
| WO | 2015188187 A1 | 12/2015 |

OTHER PUBLICATIONS

"Agilent 4-axis Direct Drive Robot", Youtube video by j0ndrums, available at: https://www.youtube.com/watch?v=q8iVuyYsnng, accessed Apr. 13, 2018; 2 pages.
(Continued)

*Primary Examiner* — Darrin D Dunn
(74) *Attorney, Agent, or Firm* — McCarter & English, LLP

(57) ABSTRACT

According to some aspects of the invention, auxiliary axis measurement systems for determining three-dimensional coordinates of an object are provided as shown and described herein. According to some aspects of the invention, methods for operating auxiliary axis measurement systems for determining three-dimensional coordinates of an object are provided as shown and described herein.

21 Claims, 21 Drawing Sheets

Related U.S. Application Data

(60) Provisional application No. 62/714,861, filed on Aug. 6, 2018, provisional application No. 62/656,477, filed on Apr. 12, 2018.

(52) U.S. Cl.
CPC ............. *G05B 2219/37193* (2013.01); *G05B 2219/40233* (2013.01); *G05B 2219/40596* (2013.01); *G05B 2219/45061* (2013.01)

(58) Field of Classification Search
CPC .......... G05B 2219/37576; G05B 2219/37196; G05B 2219/37008; G05B 2219/36425; G05B 2219/36318; G05B 2219/36288; G05B 2219/37197; G05B 2219/37227; G05B 19/27; G05B 2219/34242; G05B 2219/37024; G05B 2219/37193; G05B 2219/37198; G05B 2219/37304; G05B 2219/50058; G05B 2219/50062; G05B 2219/50074; G05B 2219/50136; G05B 19/404; G05B 19/4086; G05B 19/182; G05B 19/19

See application file for complete search history.

(56) References Cited

U.S. PATENT DOCUMENTS

| | | | |
|---|---|---|---|
| 4,880,992 A | 11/1989 | Niedermayr et al. | |
| 4,888,877 A | 12/1989 | Enderle et al. | |
| 5,134,782 A | 8/1992 | Breyer et al. | |
| 5,197,846 A | 3/1993 | Uno et al. | |
| 5,204,824 A | 4/1993 | Fujimaki | |
| 5,313,563 A | 5/1994 | Hara | |
| 5,402,582 A | 4/1995 | Raab | |
| 5,412,880 A | 5/1995 | Raab | |
| 5,539,975 A | 7/1996 | Kukuljan et al. | |
| 5,611,147 A | 3/1997 | Raab | |
| 5,724,264 A | 3/1998 | Rosenberg et al. | |
| 5,758,429 A | 6/1998 | Farzan et al. | |
| 6,134,506 A | 10/2000 | Rosenberg et al. | |
| 6,511,035 B1* | 1/2003 | Teel | F16F 15/02 248/550 |
| 6,775,586 B2 | 8/2004 | Shibata et al. | |
| 7,054,775 B2* | 5/2006 | Rosenberg | B25J 9/1692 702/152 |
| 7,152,456 B2 | 12/2006 | Eaton | |
| 7,366,637 B2* | 4/2008 | Goto | G01B 5/008 702/167 |
| 7,395,606 B2 | 7/2008 | Crampton | |
| 7,578,069 B2 | 8/2009 | Eaton | |
| 7,591,078 B2 | 9/2009 | Crampton | |
| 7,706,007 B2* | 4/2010 | Crawford | G05B 19/4185 358/1.15 |
| 7,847,502 B2 | 12/2010 | Iwashita et al. | |
| 7,852,031 B2* | 12/2010 | Hon | G05B 19/402 318/578 |
| 7,954,250 B2 | 6/2011 | Crampton | |
| 8,214,074 B2 | 7/2012 | Mies et al. | |
| 8,340,820 B2 | 12/2012 | Nair | |
| 8,350,514 B2* | 1/2013 | Otsuki | G05B 19/404 318/568.22 |
| 8,695,447 B2 | 4/2014 | Crampton | |
| 8,701,298 B2 | 4/2014 | Jordil et al. | |
| 8,705,012 B2 | 4/2014 | Greiner et al. | |
| 9,222,769 B2* | 12/2015 | Garvey | G01B 21/16 |
| 9,639,401 B1 | 5/2017 | Bertram et al. | |
| 9,734,609 B2 | 8/2017 | Pulla et al. | |
| 9,964,398 B2 | 5/2018 | Becker et al. | |
| 9,977,839 B2* | 5/2018 | Czompo | G01D 21/00 |
| 10,060,857 B1 | 8/2018 | Bouchard et al. | |
| 10,126,109 B2 | 11/2018 | Tait | |
| 10,144,125 B2 | 12/2018 | Su et al. | |
| 10,288,422 B2 | 5/2019 | Uhl et al. | |
| 10,589,394 B2 | 3/2020 | Wanner et al. | |
| 10,830,618 B2* | 11/2020 | Batten | G01B 5/0007 |
| 10,977,454 B2* | 4/2021 | Kataoka | G06K 7/10198 |
| 11,113,955 B2* | 9/2021 | Maehata | G08C 19/00 |
| 11,240,404 B2* | 2/2022 | Bangs | H04N 13/243 |
| 2004/0162700 A1* | 8/2004 | Rosenberg | G06F 3/038 702/168 |
| 2005/0111725 A1 | 5/2005 | Noda et al. | |
| 2006/0227350 A1* | 10/2006 | Crawford | G05B 19/4185 358/1.12 |
| 2006/0266100 A1 | 11/2006 | McMurtry et al. | |
| 2007/0118329 A1* | 5/2007 | Goto | G01B 5/008 73/104 |
| 2008/0271332 A1 | 11/2008 | Jordil et al. | |
| 2009/0000136 A1 | 1/2009 | Crampton | |
| 2009/0033271 A1 | 2/2009 | Hon et al. | |
| 2010/0138006 A1 | 6/2010 | Mies et al. | |
| 2010/0188034 A1 | 7/2010 | Young et al. | |
| 2010/0332209 A1 | 12/2010 | Casteres et al. | |
| 2011/0258867 A1 | 10/2011 | McDonnell et al. | |
| 2011/0277534 A1 | 11/2011 | McMurtry et al. | |
| 2012/0017455 A1 | 1/2012 | Fujimoto | |
| 2012/0150354 A1* | 6/2012 | Rogers | G05B 19/4015 702/152 |
| 2012/0279338 A1 | 11/2012 | Ihrke et al. | |
| 2012/0323373 A1* | 12/2012 | Sato | G05B 19/404 700/275 |
| 2013/0047004 A1* | 2/2013 | Hwang | G06F 1/329 713/300 |
| 2013/0116817 A1 | 5/2013 | Faughnan, Jr. et al. | |
| 2013/0253871 A1 | 9/2013 | Gray | |
| 2013/0286196 A1* | 10/2013 | Atwell | G01B 5/008 348/136 |
| 2014/0109419 A1 | 4/2014 | Shindo et al. | |
| 2014/0317942 A1 | 10/2014 | Sagemueller et al. | |
| 2015/0052768 A1 | 2/2015 | Wimmer | |
| 2015/0177726 A1* | 6/2015 | Abe | G05B 19/4086 318/574 |
| 2015/0185000 A1 | 7/2015 | Wilson et al. | |
| 2015/0185054 A1* | 7/2015 | Hesch | G01D 21/00 702/187 |
| 2016/0036916 A1* | 2/2016 | Takeda | H04L 67/12 702/89 |
| 2016/0195869 A1 | 7/2016 | Sagemueller et al. | |
| 2016/0265912 A1* | 9/2016 | Yasuno | G01B 21/042 |
| 2016/0305777 A1 | 10/2016 | Racine et al. | |
| 2016/0313114 A1 | 10/2016 | Tohme et al. | |
| 2017/0028557 A1 | 2/2017 | Battisti | |
| 2017/0041897 A1* | 2/2017 | Pitigoi-Aron | H04J 3/0685 |
| 2017/0276472 A1 | 9/2017 | Becker et al. | |
| 2017/0278759 A1 | 9/2017 | Sukegawa et al. | |
| 2017/0283084 A1 | 10/2017 | Gang et al. | |
| 2017/0363403 A1 | 12/2017 | Jonas | |
| 2017/0365164 A1* | 12/2017 | Maehata | G08C 23/04 |
| 2018/0095174 A1 | 4/2018 | Mertz | |
| 2018/0149457 A1* | 5/2018 | Masuta | G01B 3/22 |
| 2018/0169813 A1 | 6/2018 | Wanner et al. | |
| 2018/0203432 A1 | 7/2018 | Walker et al. | |
| 2018/0216923 A1 | 8/2018 | Creachbaum et al. | |
| 2018/0257238 A1 | 9/2018 | Hashimoto et al. | |
| 2018/0283858 A1* | 10/2018 | Uhl | G01B 21/04 |
| 2018/0299247 A1* | 10/2018 | Honda | G01B 5/061 |
| 2018/0321980 A1 | 11/2018 | Lo et al. | |
| 2019/0034223 A1 | 1/2019 | Yang | |
| 2019/0105774 A1 | 4/2019 | Oyama et al. | |
| 2019/0111534 A1 | 4/2019 | Ishii et al. | |
| 2019/0143523 A1 | 5/2019 | Harel et al. | |
| 2019/0247970 A1 | 8/2019 | Ishii et al. | |
| 2019/0265081 A1* | 8/2019 | Batten | G01B 21/04 |
| 2019/0268003 A1* | 8/2019 | Loinaz | G01S 17/26 |
| 2019/0286857 A1* | 9/2019 | Kataoka | H04Q 9/00 |
| 2019/0293402 A1* | 9/2019 | Kiyotani | G01B 5/008 |
| 2019/0293416 A1 | 9/2019 | Novakovic et al. | |
| 2019/0316899 A1 | 10/2019 | Lankalapalli et al. | |
| 2019/0317470 A1 | 10/2019 | Lankalapalli et al. | |
| 2020/0049477 A1 | 2/2020 | Lankalapalli et al. | |
| 2020/0137705 A1* | 4/2020 | Takeda | H04W 56/0015 |

(56) References Cited

U.S. PATENT DOCUMENTS

2020/0153527 A1* 5/2020 Matsunaga ........... H04J 3/0664
2021/0383133 A1* 12/2021 Wang ..................... G01S 13/86
2022/0236252 A1* 7/2022 Hayter ................... G16H 20/10

OTHER PUBLICATIONS

"EMS Benelux supplier from Wenzel Mobilescan 3d scanner", Youtube video by wenzelbenelux, published on May 18, 2011, available at: https://www.youtube.com/watch?v=hf7xTv48sMU, accessed Apr. 20, 2018; 2 pages.
"File:HarmonicDriveAni.gif", Wikipedia, Retrieved from the Internet Sep. 14, 2018: [https://en.wikipedia.org/wiki/File:HarmonicDriveAni.gif] Published Dec. 5, 2016; 6 pages.
"Introducing KINOVA Gen3 Ultra lightweight robot", Brochure, Kinova inc, 2018, 5 pages.
"The Mobile CNC Measurement and 3D Scanning System", Wenzel Scantec, Oct. 2010; 8 pages.
"UCC2 universal CMM controller", Renishaw, Installation Guide, 2008 (86 pages).
Bradley, Michael "Robotic arm joint", YouTube Video, Retrieved via internet Sep. 14, 2018 [https://www.youtube.com/watch?v=Z1tBqWnBKZY] Published Sep. 3, 2013; 2 pages.

\* cited by examiner

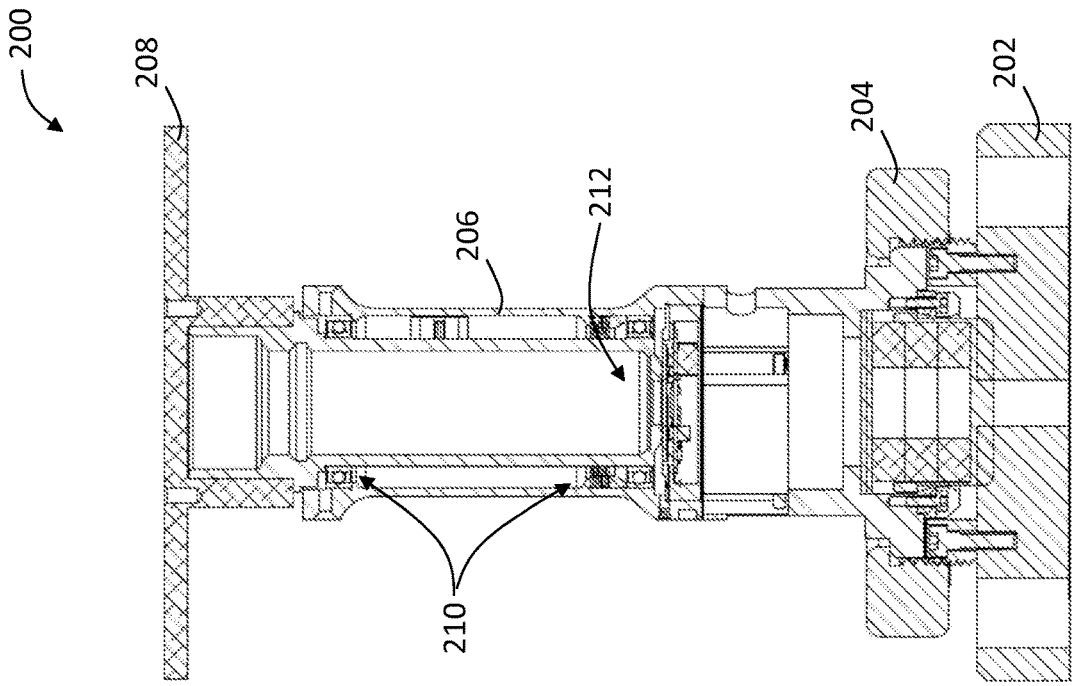
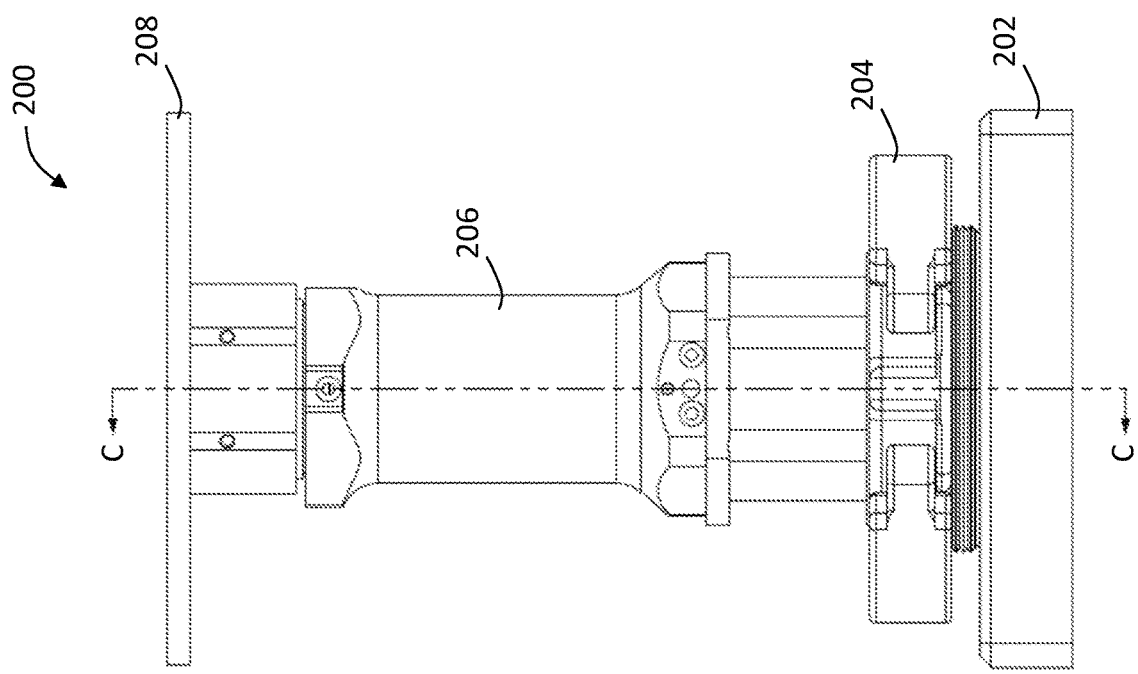

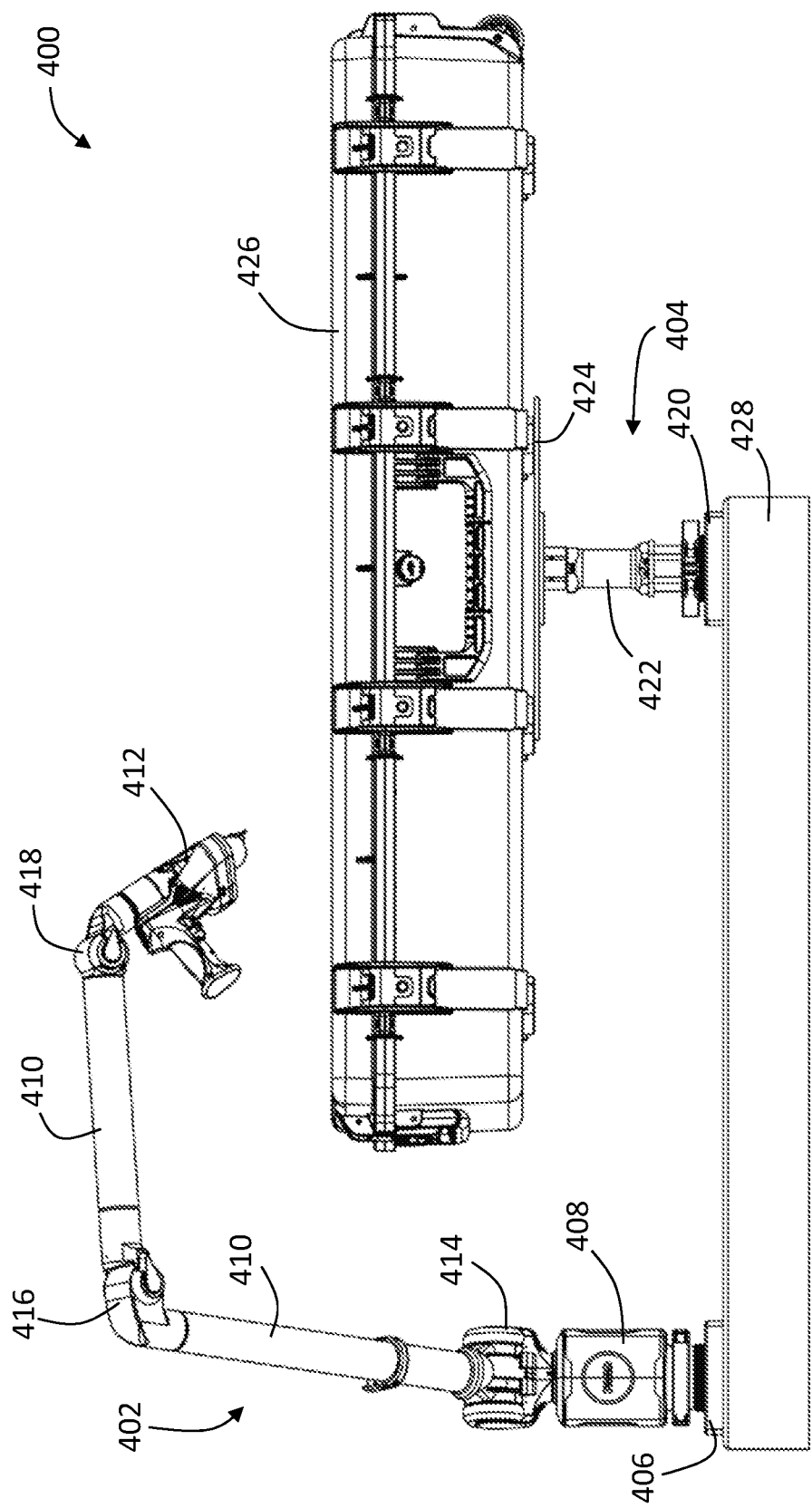

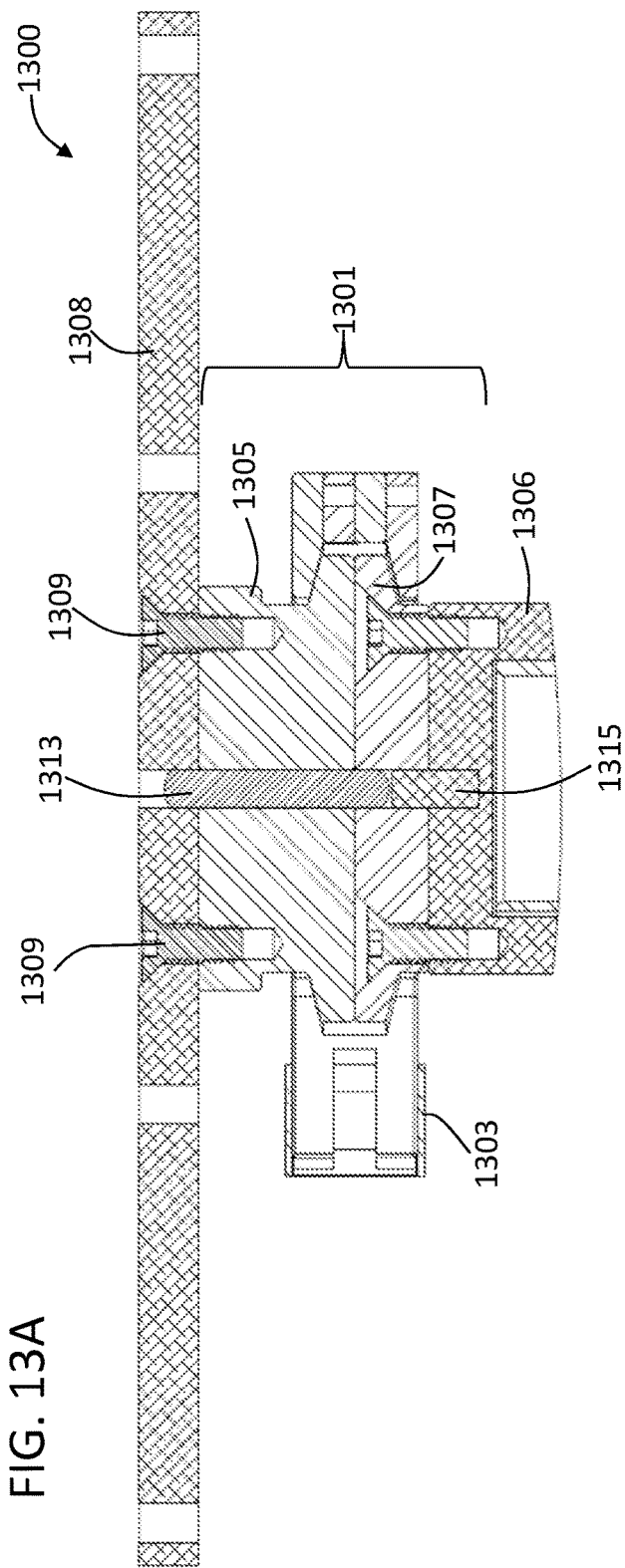

COORDINATE MEASUREMENT SYSTEM WITH AUXILIARY AXIS

CROSS REFERENCE TO RELATED APPLICATIONS

This application is a Continuation of U.S. application Ser. No. 16/364,474 filed Mar. 26, 2019, which claims the benefit of U.S. Provisional Application Ser. No. 62/714,861 filed Aug. 6, 2018, and U.S. Provisional Application Ser. No. 62/656,477 filed Apr. 12, 2018, the entire disclosures of which are incorporated herein by reference.

BACKGROUND

The present disclosure relates to coordinate measuring systems, and in particular to auxiliary systems for precision metrology and other coordinate measuring systems.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive, and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

Relative rotational movement between the arm segments of the AACMM typically involves cartridges having a pair of bearings and an angular encoder. Accordingly, while existing methods of manufacturing AACMMs and other measuring devices are suitable for their intended purposes the need for improvement remains, particularly in providing improved measurement and scanning techniques.

BRIEF DESCRIPTION

According to some aspects of the invention, auxiliary axis measurement systems for determining three-dimensional coordinates of an object are provided as shown and described herein.

According to some aspects of the invention, methods for operating auxiliary axis measurement systems for determining three-dimensional coordinates of an object are provided as shown and described herein.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2B is a side elevation illustration of the portion of the auxiliary multi-axis system assembly of FIG. 2A;

FIG. 2C is a cross-sectional illustration of the portion of the auxiliary multi-axis system assembly of FIG. 2B as viewed along the line C-C;

FIG. 4A is a schematic illustration of an auxiliary axis measurement system in accordance with an embodiment of the present disclosure;

FIG. 13A is a cross-sectional view of a portion of an auxiliary multi-axis assembly in accordance with an embodiment of the present disclosure; and FIG. 13B is a cross-sectional view of a portion of a releasable connector assembly of the auxiliary multi-axis assembly of FIG. 13A.

The detailed description explains embodiments of the invention, together with advantages and features, by way of example with reference to the drawings.

DETAILED DESCRIPTION

Embodiment of the present invention provide multi-axis measurement systems incorporating an auxiliary axis. Various embodiments can include automated and/or motorized cartridges for use with coordinate measuring systems and/or cartridges that are responsive to manual operation and/or manipulation. Embodiments of the invention provide advantages in providing vastly improved coordinate measurements and real-time data collection from multiple axes of the multi-axis measurement systems.

Figure 1A:
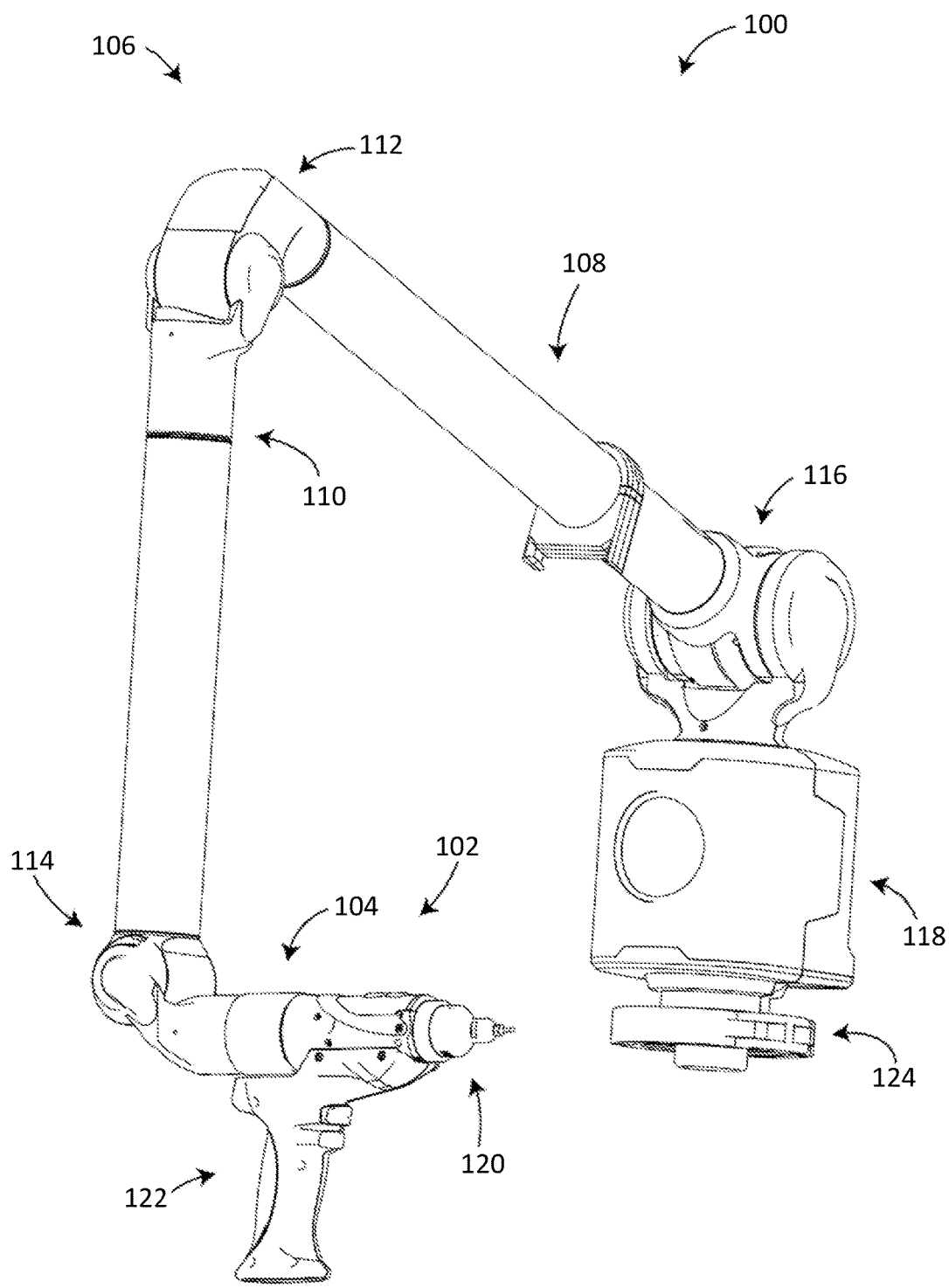
FIG. 1A is an isometric view of a portable articulated arm coordinate measuring machine (AACMM) that may incorporate embodiments of the present disclosure.
Figure 1B:
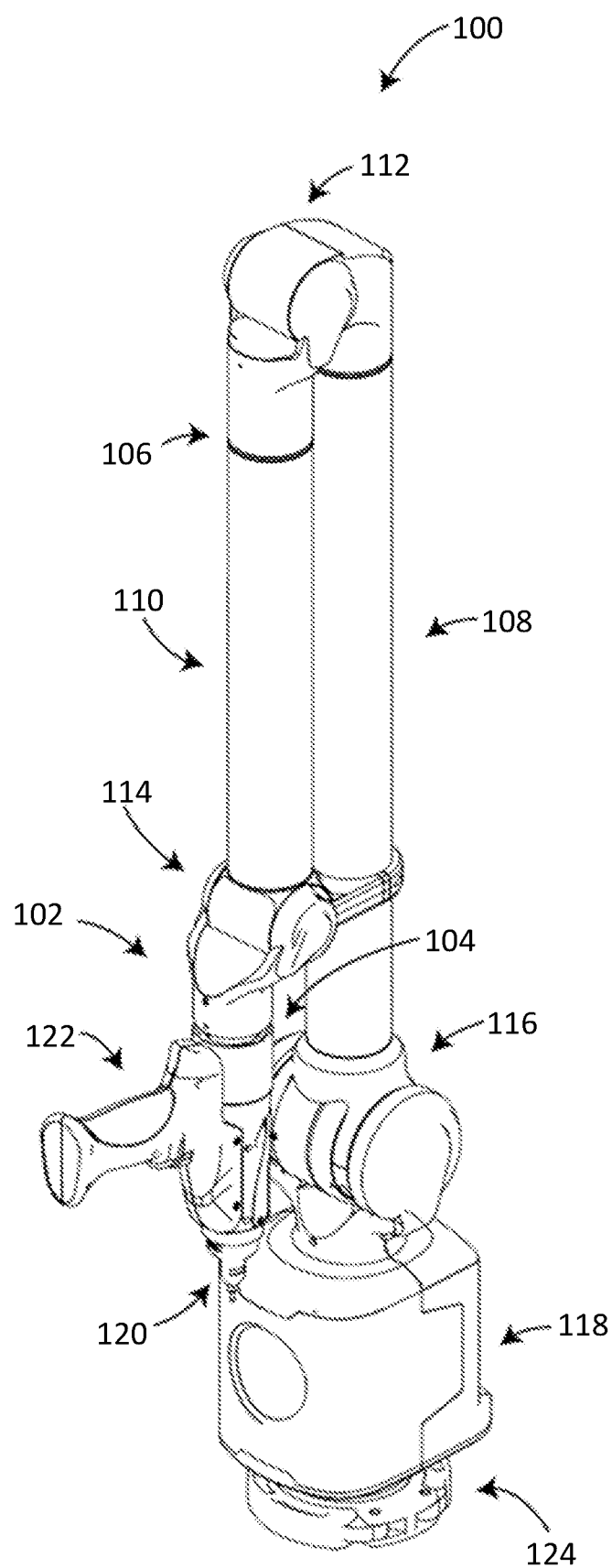
FIG. 1B is another isometric view of the portable AACMM of FIG. 1A.

FIGS. 1A and 1B illustrate, in perspective, a portable articulated arm coordinate measuring machine (AACMM) 100 that may be employed with embodiments of the present disclosure. The AACMM 100 is one type of coordinate measuring machine that can be employed with embodiments of the present disclosure, and thus the discussion and description is presented herein merely for illustrative and explanatory purposes, and the specific illustrative embodiments are not intended to be limiting.

As shown in FIGS. 1A and 1B, the AACMM 100 may comprise a six or seven axis articulated measurement device having a probe device 102 that includes a measurement probe housing 104 coupled to an arm portion 106 of the AACMM 100 at one end. The arm portion 106 comprises a first arm segment 108 coupled to a second arm segment 110 by a rotational connection having a first bearing cartridge 112 (e.g., one or more bearing cartridges). A second bearing cartridge 114 (e.g., one or more bearing cartridges) couples the second arm segment 110 to the measurement probe housing 104. A third bearing cartridge 116 (e.g., one or more bearing cartridges) couples the first arm segment 108 to a control unit 118 located at the other end of the arm portion 106 of the AACMM 100. Each of the bearing cartridges 112, 114, 116 provides for multiple axes of articulated movement. In some embodiments, the bearing cartridges 112, 114, 116 may be configured or replaced by groupings of bearing cartridges, and thus single bearing cartridge arrangements are not to be limiting. Further, the measurement probe housing 104 of the probe device 102 can include a shaft of a seventh axis portion of the AACMM 100 (e.g., a cartridge containing measurement probe or measurement probe system that determines movement of the measurement device, for example a probe 120, in the seventh axis of the AACMM 100). In this illustrative embodiment, the probe device 102 may rotate about an axis extending through the center of the measurement probe housing 104. In use of the AACMM 100, the control unit 118 is typically affixed to a work surface.

Each bearing cartridge 112, 114, 116 typically contains a measurement probe system (e.g., an optical angular measurement probe system, a touch probe system, etc.). The measurement probe system (i.e., transducer) provides an indication of the position of the respective arm segments 108, 110 and corresponding bearing cartridges 112, 114, 116 (or bearing cartridge groupings) that, all together, provide an indication of the position of the probe 120 with respect to the control unit 118 (and, thus, the position of an object being measured by the AACMM 100 in a certain frame of reference—for example a local or global frame of reference). The arm segments 108, 110 may be made from a suitably rigid material such as, but not limited to, a carbon composite material, for example. The portable AACMM 100 with six or seven axes of articulated movement (i.e., degrees of freedom) provides advantages in allowing an operator to position the probe 120 in a desired location within a 360° area about control unit base 118 while providing an arm portion 106 that may be easily handled by the operator. However, it should be appreciated that the illustration of an arm portion 106 having two arm segments 108, 110 is for exemplary purposes, and the claimed invention should not be so limited. An AACMM in accordance with embodiments of the present disclosure may have any number of arm segments coupled together by bearing cartridges (and, thus, more or less than six or seven axes of articulated movement or degrees of freedom).

As will be appreciated by those of skill in the art, each of the bearing cartridges 112, 112, 114 may optionally include one or more slip rings. The slip rings allow for the transfer of electricity (e.g., power and/or data) along the length of the arm portion 106 while still allowing each of the bearing cartridges 112, 114, 116 to rotate substantially unencumbered and independently from each other.

The probe 120 is detachably mounted to the measurement probe housing 104, which is connected to the second bearing cartridge 114. A handle 122 is removably connected or attached to the measurement probe housing 104 by way of, for example, a quick-connect interface. In the some embodiments, a quick-connect interface may include both mechanical fastening members that secure the handle 122 and/or the probe 120 to the housing 102 and electrical connections that allow a user to control the probe 120 through the handle 122 (e.g. actuation buttons) and also provide for high speed data communication between the handle 122 and/or the probe 120 and the control unit 118. In some embodiments, the handle 122 and/or the probe 120 may be replaced with another device or accessory (e.g., a laser line probe, a bar code reader), thereby providing advantages in allowing the operator to use different measurement devices with the same AACMM 100.

In some embodiments, the probe 120 may be removably attached to the measurement probe housing 104. In some embodiments, the probe 120 may be a contacting measurement device and may have different tips or ends that are arranged to enable physical contact with an object to be measured, including, but not limited to ball, touch-sensitive, curved, and extension type probes. In other embodiments, the measurement may be performed, for example, by a non-contacting device such as a laser line probe (LLP). In one example embodiment, the handle 122 may be replaced with an LLP using a quick-connect interface. Other types of accessory devices may replace the removable handle 122 to provide additional functionality. Examples of such accessory devices include, but are not limited to, one or more illumination lights, temperature sensors, thermal scanners, bar code scanners, projectors, paint sprayers, cameras, video cameras, audio recording systems, etc.

In some embodiments, such as shown in FIGS. 1A and 1B, the AACMM 100 may include a removable handle 122 attached to the measurement probe housing 104 that provides advantages in allowing accessories, devices, and/or functionality to be changed without removing the measurement probe housing 104 from the second bearing cartridge 114. As noted above, the removable handle 122 may also include one or more electrical connectors that allow electrical power and/or data to be exchanged between the handle 122 and corresponding electronics located in the probe 102 and/or the control unit 118.

In various embodiments, and as will be discussed in more detail below, each rotational connection of the AACMM 100 includes the bearing cartridges 112, 114, 116 that allow the arm portion 106 of the AACMM 100 to move about multiple axes of rotation. As mentioned, each bearing cartridge 112, 114, 116 includes a corresponding measurement probe system, such as optical angular encoders for example, that are each arranged coaxially with the corresponding axis of rotation of, e.g., the arm segments 108, 110. The measurement probe systems detect rotational (swivel) or transverse (hinge) movement of, for example, each one of the arm segments 108, 110 about a corresponding axis and transmits a signal to an electronic data processing system within the AACMM 100. In some embodiments, each individual raw encoder count may be sent separately to the electronic data processing system as a signal where it is further processed into measurement data.

The control unit 118 may include an attachment device or mounting device 124. The mounting device 124 allows the AACMM 100 to be removably mounted to a desired location, such as a base, an inspection table, a machining center, a wall, the floor, etc. In accordance with an embodiment, the control unit 118 of the portable AACMM 100 contains or houses an electronic data processing system that includes various electronic and/or processing components. For example, in one non-limiting embodiment, the control unit 118 can contain or house a processing system that processes data received from the various measurement probe systems within the AACMM 100 (e.g., within the bearing cartridges 112, 114, 116) as well as data representing other arm parameters to support three-dimensional (3-D) positional calculations and a user interface processing system that includes an on-board operating system, a touch screen display, and resident application software that allows for relatively complete metrology functions to be implemented within the AACMM 100 without the need for connection to an external computer, although such connection may be employed in some embodiments.

The electronic data processing system in the control unit 118 may communicate with the measurement probe systems, sensors, and other peripheral hardware located away from the control unit 118 (e.g., a LLP that can be mounted to or within the removable handle 122 on the AACMM 100). The electronics that support these peripheral hardware devices or features may be located in each of the bearing cartridges 112, 114, 116 located within the portable AACMM 100.

Although shown and described with respect to an articulated arm coordinate measuring machine, the present disclosure is not to be limited thereby. For example, although an arm configuration has been shown and described, various other movement/rotational device systems may incorporate embodiments described herein. That is, various types of systems, assemblies, devices, components, etc. can incorporate cartridges as described with respect to the articulated arm coordinate measuring machine of FIGS. 1A-1B, including rotatable platters, turntables, conveyor belts, rotatable imagers, etc.

Embodiments of the present disclosure are directed to using an auxiliary multi-axis system, for example, having a rotary turntable containing one or more cartridge/encoder systems connected to an AACMM to achieve enhanced scanning volume and augment the usability, productivity, user experience, and ergonomics of the AACMM. In some embodiments, an auxiliary multi-axis assembly can have one or more (e.g., three) degrees of freedom, e.g., rotate, tilt, and translation axes. In an embodiment where the auxiliary multi-axis assembly a turntable, an object to be scanned (e.g., a "target") may be secured on a turntable platform to enable movement of the target (e.g., rotation, vertical movement, translation, tilt). In some embodiments, a tilt may be implemented using an angled bracket or similar structure. In some embodiments, the movement of the platform may be performed manually or may be motorized, e.g., controlled by a user via a foot-switch or joystick. One or more encoders of the auxiliary multi-axis assembly is synchronized and calibrated using algorithms, hardware, and software to operate in concert with a primary axis system.

As provided herein, the primary and auxiliary axes systems and assemblies may take many different forms, and combinations thereof. For example, the primary and auxiliary axes systems and assemblies may include AACMMs with various types of sensors (contact probes, non-contact probes, etc.), multiline laser line probes, area scanners with structured light sensors, camera and/or image sensors (color or non-color), non-contact scanners, laser trackers, or other types of measurements systems as will be appreciated by those of skill in the art. In some non-limiting embodiments, the primary system may be a system having six degrees of freedom and the auxiliary system may have one or more auxiliary axes. Accordingly, the present disclosure and described embodiments are provided for illustrative and explanatory purposes and are not to be limiting.

Figure 2A:
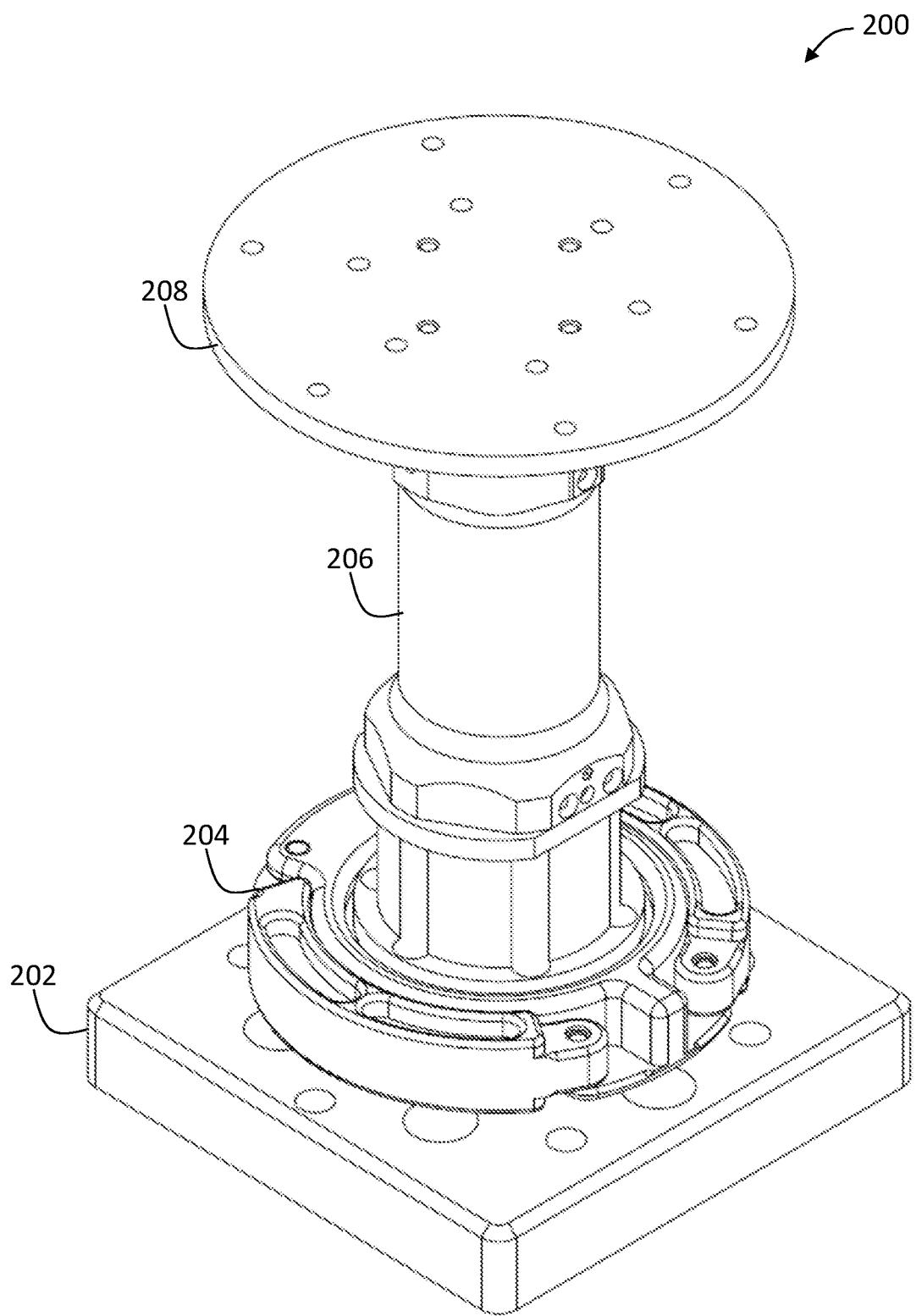
FIG. 2A is an isometric illustration of a portion of an auxiliary multi-axis system assembly in accordance with an embodiment of the present disclosure.

Turning now to FIGS. 2A-2C, schematic illustrations of a portion of an auxiliary multi-axis assembly 200 in accordance with an embodiment of the present disclosure are shown. FIG. 2A is an isometric illustration of the portion of the auxiliary multi-axis assembly 200, FIG. 2B is a side elevation illustration of the portion of the auxiliary multi-axis assembly 200, and FIG. 2C is a cross-sectional illustration the portion of the auxiliary multi-axis assembly 200 as viewed along the line C-C of FIG. 2B. As described herein the auxiliary multi-axis assembly 200 may be operably connected to an AACMM, such as that shown and described with respect to FIGS. 1A-1B, and may provide one or more additional axes to the measurement system to provide precise measurement of a target, which may be located on the auxiliary multi-axis assembly 200.

As shown, the auxiliary multi-axis assembly 200 includes a base 202 and an attachment device or mounting device 204 configured on the base 202. A bearing cartridge 206 is connected to the base 202 by the mounting device 204. The cartridge 206 is rotatable to drive rotation of a platform 208. In some embodiments, the mounting device 204 may be substantially similar to the mounting device 124 shown in FIGS. 1A-1B. The bearing cartridge 206 may be operably connected to and in communication with an electronic data processing system that includes various electronic and/or processing components. For example, in one non-limiting embodiment, a processing system may be located remote from and in communication (e.g., wired or wirelessly) with the cartridge 206. The processing system is configured to process data received from the auxiliary multi-axis assembly 200 (e.g., the bearing cartridge 206) as well as data representing other assembly parameters to support three-dimensional (3-D) positional calculations and a user interface processing system that includes an on-board operating system, a touch screen display, and resident application software that allows for relatively complete metrology functions to be implemented using the auxiliary multi-axis assembly 200.

The bearing cartridge 206 includes one or more bearings 210 to enable rotation of the platform 208. The rotation of the platform 208 may be manual or may be driven by a motor or other driving mechanism (e.g., automated). The rotation of the platform 208 is measured by an encoder system 212, which may be similar to the encoders employed in the bearing cartridges described above. In some embodiments, the platform 208 may additionally (or alternatively) be arranged to tilt and/or translate, with such motion monitored by one or more associated encoder systems, as will be appreciated by those of skill in the art. Additionally, although shown with a specific platform size and shape, those of skill in the art will appreciate that any type, size, and/or shape of platform may be employed without departing from the scope of the present disclosure. The platform is merely a portion of the auxiliary multi-axis assembly 200 to support, attach to, connect to, or otherwise hold a target to be measured by a measurement system as shown and described herein.

Figure 3A:
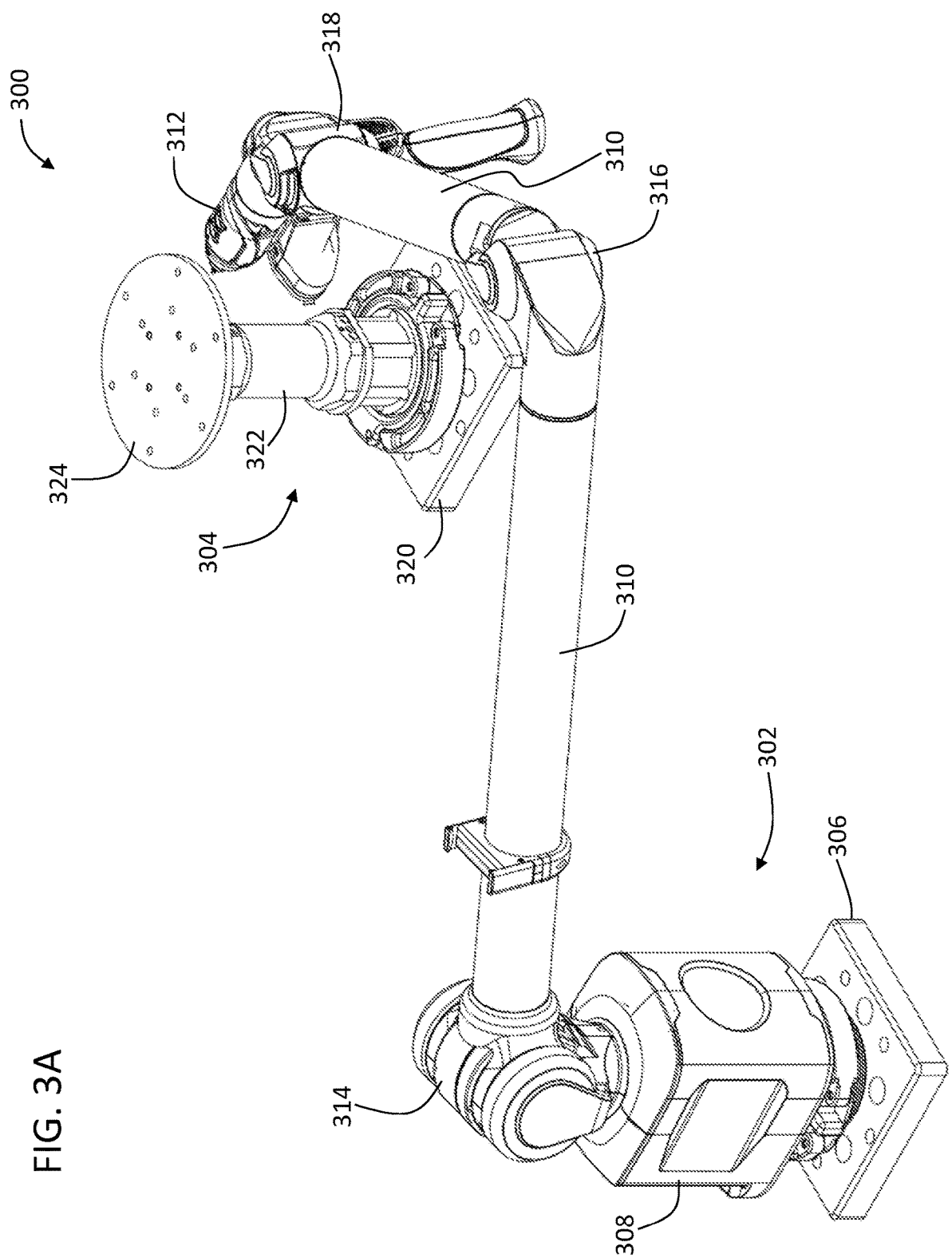
FIG. 3A is a schematic illustration of an auxiliary axis measurement system in accordance with an embodiment of the present disclosure.
Figure 3B:
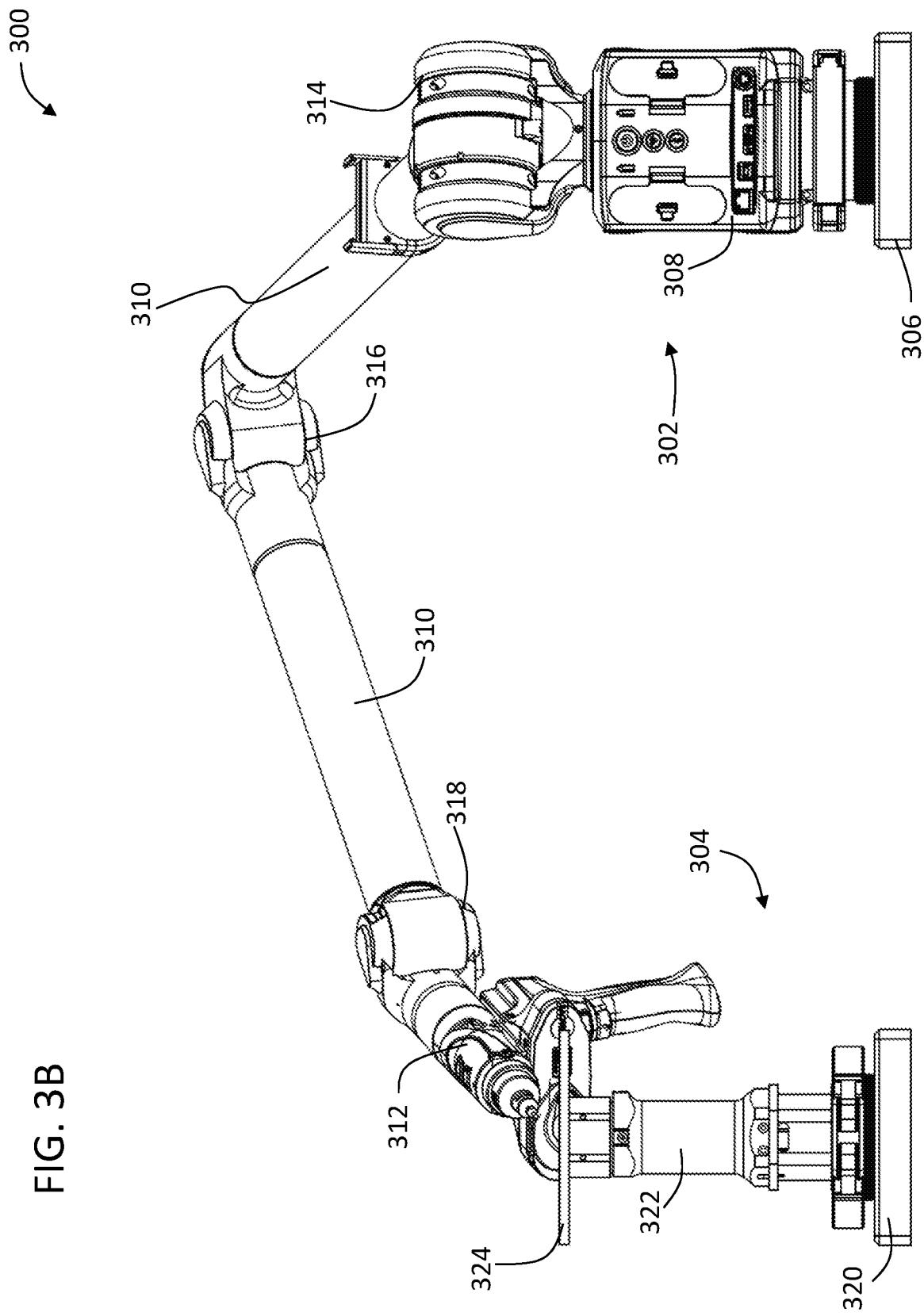
FIG. 3B is an alternative view of the auxiliary axis measurement system of FIG. 3A.

Turning now to FIGS. 3A-3B, schematic illustrations of an auxiliary axis measurement system 300 in accordance with an embodiment of the present disclosure are shown. The auxiliary axis measurement system 300 includes a primary axes assembly 302, illustratively shown as an AACMM, and an auxiliary multi-axis assembly 304, illustratively shown as a turntable assembly. The primary axes assembly 302 may be similar to that shown and described above with respect to FIGS. 1A-1B and the auxiliary axis assembly 304 may be similar to that shown and described above with respect to FIGS. 2A-2C.

The primary axes assembly 302 includes a first base 306 having a control unit 308 mounted thereto. The control unit 308 can include various electronics to enable control and operation of the primary axes assembly 302, including movement of one or more arm segments 310 having a probe device 312 located on an end thereof The probe device 312 is moveable relative to the control unit 308 and the auxiliary axis assembly 304 by movement and/or rotation at a first bearing cartridge 314, a second bearing cartridge 316, and a third bearing cartridge 318, with the arm segments 310 located therebetween, as shown. The probe device 312 is operably connected to the third bearing cartridge 318, in a similar arrangement as that described above with respect to FIGS. 1A-1B.

The auxiliary axis assembly 304 includes a second base 320 with an auxiliary axis bearing cartridge 322 mounted thereon. A platform 324 is affixed to the auxiliary axis bearing cartridge 322, with the auxiliary axis bearing cartridge 322 configured to enable rotation (and/or tilt and/or translation) of the platform 324.

Each of the bearing cartridges 314, 316, 318, 322 have an encoder system therein that is arranged to measure movement (e.g., rotation) at the respective bearing cartridge 314, 316, 318, 322. The encoder systems can include one or more encoders arranged to measure or monitor one or more respective axes. For example, in an AACMM arrangement with an auxiliary multi-axis assembly being a turntable, the AACMM may include seven axes of rotation and the auxiliary multi-axis assembly may provide a single eighth axis at the turntable. This is merely for example, and other arrangements and numbers of axes within the primary system or the auxiliary multi-axis assembly may be employed without departing from the scope of the present disclosure. Accordingly, although described with four bearing cartridges (with associated one or more encoders) these arrangements are merely for example only and are not intended to be limiting.

Further, each of the encoder systems of the bearing cartridges 314, 316, 318, 322 are in communication with the control unit 308 (or other computing/control system). The communication connection between the bearing cartridges 314, 316, 318, 322 and the control unit 308 enables synchronized data collection from the respective encoder systems such that the auxiliary axis bearing cartridge 322 operates as an additional axis within the primary axes assembly 302, i.e., as an additional axis with the axes of the bearing cartridges 314, 316, 318. It should be appreciated that the control unit 308 may be able to determine the 3D coordinates of the probe end in a local frame of reference based on the signals from the encoders/encoder systems within the bearing cartridges 314, 316, 318.

Scanning odd shaped and/or large objects (i.e., targets) can be a difficult task due to various geometries of the target and limitations on a user's ability to maneuver relative to the target. However, by using a measurement system of the present disclosure, such as auxiliary axis measurement system 300 shown and described with respect to FIGS. 3A-3B, a scanning volume of a primary axes assembly (e.g., AACMM) can be enlarged. Further, various embodiments provided here can enable scanning objects nearing the scanning envelope (largest extension/extend of the arm segments) of an AACMM an easier task.

Referring again to FIGS. 3A-3B, the auxiliary axis assembly 304 includes the auxiliary axis bearing cartridge 322 (an encoder system) which is connected to communicate signals to the primary axes assembly 302. Such connection can enable a metrology grade accuracy to a scan of a target located on the platform 324. As noted above, the auxiliary axis assembly 304 can have one or more axes of rotation, such as rotary/vertical, tilt/horizontal, and/or linear/translation. In an auxiliary multi-axis assembly, each axis of the auxiliary multi-axis assembly may be associated with a respective bearing cartridge and/or encoder system, and the electronics thereof may be connected to the control unit 308 (or other external computing/control system).

As such, in accordance with embodiments of the present disclosure, the primary axes assembly 302 is arranged to include the axis (or axes) of the auxiliary axis assembly 304 as joints which add to the existing degrees of freedom of the AACMM (e.g., increasing a typical 7 degrees of freedom by one or more additional degrees of freedom as provided by the axes of the auxiliary axis assembly 304). The auxiliary axis assembly 304 can be moved manually or can be motorized and controlled by the user via a foot-switch, joystick, or other control mechanism which can control one or multiple axis. The first base 306 and the second base 320 can be fixed bases or may be attachable or placeable on other surfaces. That is, the bases 306, 320 can enable removable mounting of the respective primary axes assembly 302 and/or auxiliary axis assembly 304 to a desired location, such as an inspection table, a machining center, a wall, the floor, etc. In some embodiments, the bases 306, 320 may be omitted without departing from the scope of the present disclosure.

In embodiments having a platform and turntable arrangement, the platform of the turntable assembly can have any desired shape, dimensions, size, and/or mounting elements. That is, the design of the turntable platform can be flexible and modular such the platform can accommodate scanning the inside of larger objects or can be extended to support larger size objects by using modular extrusion profiles for mounting objects. Further, in some embodiments, a clear material (e.g., glass or plastic) may be used for forming the platform of the turntable assembly such that scanning of a contact surface of a target located on the on the platform is possible. In still other embodiments, the platform may include openings to allow a probe end to scan or measure inside a target located on the platform. Accordingly, advantageously, embodiments provided herein can enable a full target scan.

Figure 4B:
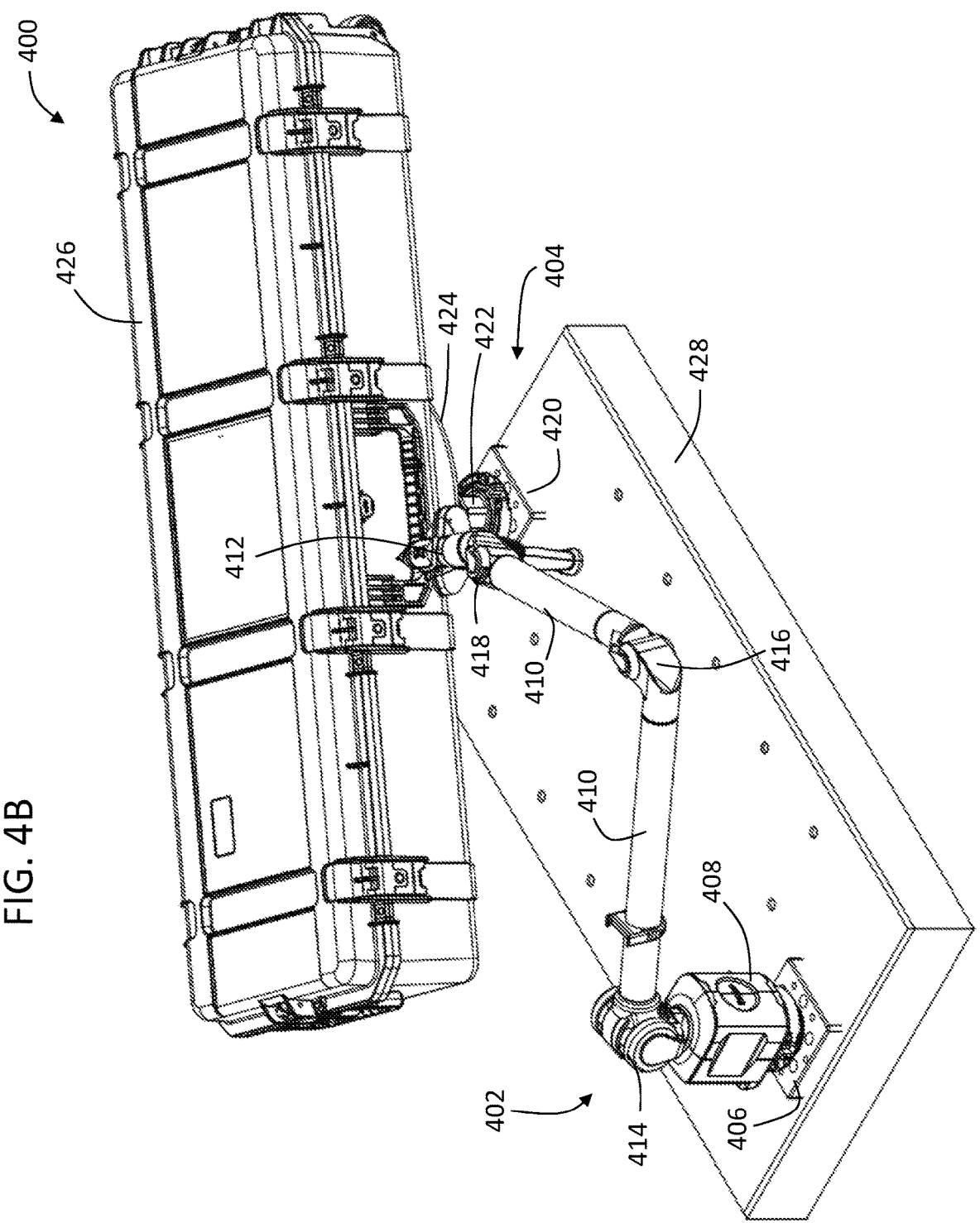
FIG. 4B is an alternative view of the auxiliary axis measurement system of FIG. 4A.

Turning now to FIGS. 4A-4B, schematic illustrations of an auxiliary axis measurement system 400 in accordance with an embodiment of the present disclosure are shown. The auxiliary axis measurement system 400 includes a primary axes assembly 402 and an auxiliary axis assembly 404, similar to that shown and described with respect to FIGS. 3A-3B. The primary axes assembly 402 may be similar to that shown and described above with respect to FIGS. 1A-1B and the auxiliary axis assembly 404 may be similar to that shown and described above with respect to FIGS. 2A-2C.

The primary axes assembly 402 includes a first base 406 having a control unit 408 mounted thereto. The control unit 408 can include various electronics to enable control and operation of the primary axes assembly 402, including movement of one or more arm segments 410 having a probe device 412 located on an end thereof. The probe device 412 is moveable relative to the control unit 408 and the auxiliary axis assembly 404 by movement and/or rotation at a first bearing cartridge 414, a second bearing cartridge 416, and a third bearing cartridge 418, with the arm segments 410 located therebetween, as shown. The probe device 412 is operably connected to the third bearing cartridge 418, in a similar arrangement as that described above with respect to FIGS. 1A-1B. The probe device 412, in some non-limiting embodiments, may include a tactile probe and a triangulation scanner such as a laser line probe (triangulation line scanner). In one non-limiting example, the probe device 412 illustratively refers to both a tactile probe and an LLP, which may be used in combination to measure an object such as the target 426.

The auxiliary axis assembly 404 includes a second base 420 with an auxiliary axis bearing cartridge 422 mounted thereon. A platform 424 is affixed to the auxiliary axis bearing cartridge 422, with the auxiliary axis bearing cartridge 422 configured to enable rotation (and/or tilt and/or translation) of the platform 424.

Each of the bearing cartridges 414, 416, 418, 422 have an encoder system therein that is arranged to measure movement (e.g., rotation) at the respective bearing cartridge 414, 416, 418, 422. Further, each of the encoder systems of the bearing cartridges 414, 416, 418, 422 are in communication with the control unit 408 (or other computing/control system). The communication connection between the bearing cartridges 414, 416, 418, 422 and the control unit 408 enables synchronized data collection from the respective encoder systems such that the auxiliary axis bearing cartridge 422 operates as an additional axis within the primary axes assembly 402.

In this illustration, a target 426 is positioned on the platform 424 and is to be measured by the measuring system 400. The target 426 can be rotated on the platform 424 and the probe device 412 can be moved relative to the target 426 to make measurements of the target 426. As the target 426 is rotated on the platform 424 and/or the probe device 412 is moved relative to the target 426, the encoder systems of the bearing cartridges 414, 416, 418, 422 will measure the positioned thereof, and thus enable a highly accurate scan of the target 426.

Further, in this illustration, the bases 406, 420 of the primary axes assembly 402 and the auxiliary axis assembly 404 are fixedly attached to, mounted to, or part of a table 428. The table 428 may be an inspection table. In some embodiments, the table 428 can provide a housing to enable connection and/or communication between the auxiliary axis bearing cartridge 422 of the auxiliary axis assembly 404 and the control unit 408 of the primary axes assembly 402.

Figure 5:
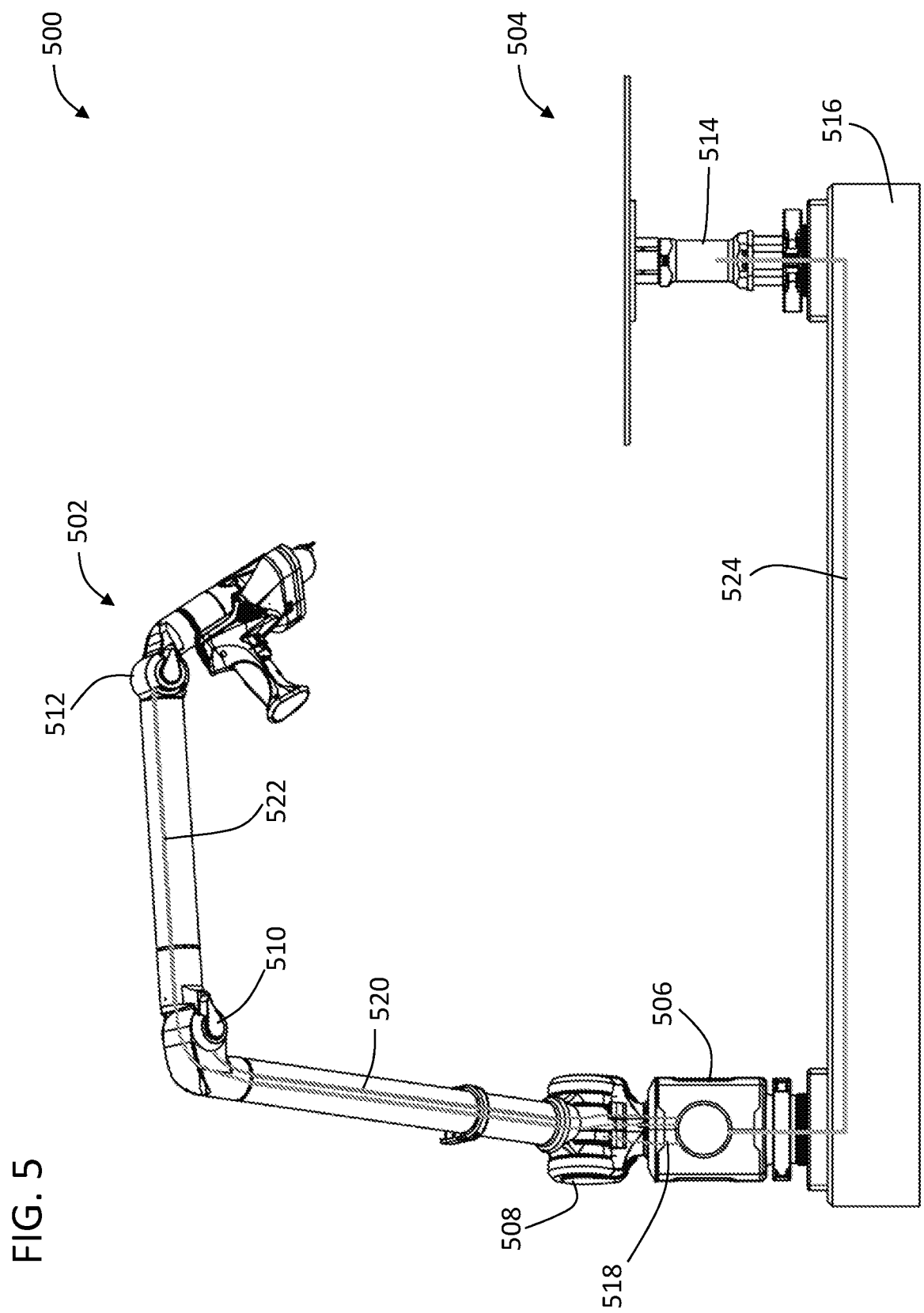
FIG. 5 is a schematic illustration of an auxiliary axis measurement system in accordance with an embodiment of the present disclosure.

Turning now to FIG. 5, a schematic illustration of an auxiliary axis measurement system 500 in accordance with an embodiment of the present disclosure is shown. The auxiliary axis measurement system 500 includes a primary axes assembly 502 and an auxiliary axis assembly 504, similar to that shown and described above. The primary axes assembly 502 includes a control unit 506 that is operably connected to and/or in communication with a plurality of encoder systems of respective bearing cartridges. For example, similar to the embodiments described above, the auxiliary axis measurement system 500 includes a first bearing cartridge 508, a second bearing cartridge 510, a third bearing cartridge 512, and an auxiliary axis bearing cartridge 514. The first, second, and third bearing cartridges 508, 510, 512 are part of the primary axes assembly 502 and the auxiliary axis bearing cartridge 514 is part of the auxiliary axis assembly 504. As shown, the primary axes assembly 502 and the auxiliary axis assembly 504 are mounted to a table 516, such as an inspection table.

A first communication line 518 connects the first bearing cartridge 508 to the control unit 506 of the primary axes assembly 502. A second communication line 520 connects the second bearing cartridge 510 to the control unit 506 of the primary axes assembly 502. A third communication line 522 connects the third bearing cartridge 512 to the control unit 506 of the primary axes assembly 502. A fourth communication line 524 connects the auxiliary axis bearing cartridge 514 to the control unit 506 of the primary axes assembly 502. The first, second, and third communication lines 518, 520, 522 are configured to pass through internal portions of the primary axes assembly 502 without impeding movement and/or motion thereof (e.g., by the use of slip rings). The fourth communication line 524 is a line that extends from the auxiliary axis bearing cartridge 514, through the table 516, and to the control unit 506, as schematically shown. The communication lines 518, 520, 522, 524 are arranged to operably connect encoder systems of the respective bearing cartridges 508, 510, 512, 514 to the control unit 506 where data from the encoder systems can be collected, stored, processed, etc. to generate scanning data associated with movement of the bearing cartridges 508, 510, 512, 514 and thus of a target located or positioned on a platform of the auxiliary axis assembly 504. Accordingly, in some embodiments, the communication lines 518, 520, 522, 524 may form a common bus for transmission of data or signals associated with the various encoders of the bearing cartridges 508, 510, 512, 514.

Although illustratively shown as wires or physical connections, the communication lines 518, 520, 522, 524 may be wireless connections. Further, although shown as internal wiring, in this illustrative embodiment, in some embodiments, one or more of the communications lines 518, 520, 522, 524 may be external to the positions shown. For example, in some embodiments, the fourth communication line 524 may be a wire that is placed on a top surface of the table 516, and may not be an internal connection. In one embodiment, the communication line 524 may be removably connected to the control unit 506, such as via a universal serial bus (USB) connection. Further, although the communications lines 518, 520, 522 in the primary axes assembly 502 are illustratively shown as separate connections, in some embodiments, a single bus can operably connect each of the encoder systems located within or part of the primary axes assembly 502.

Figure 6:
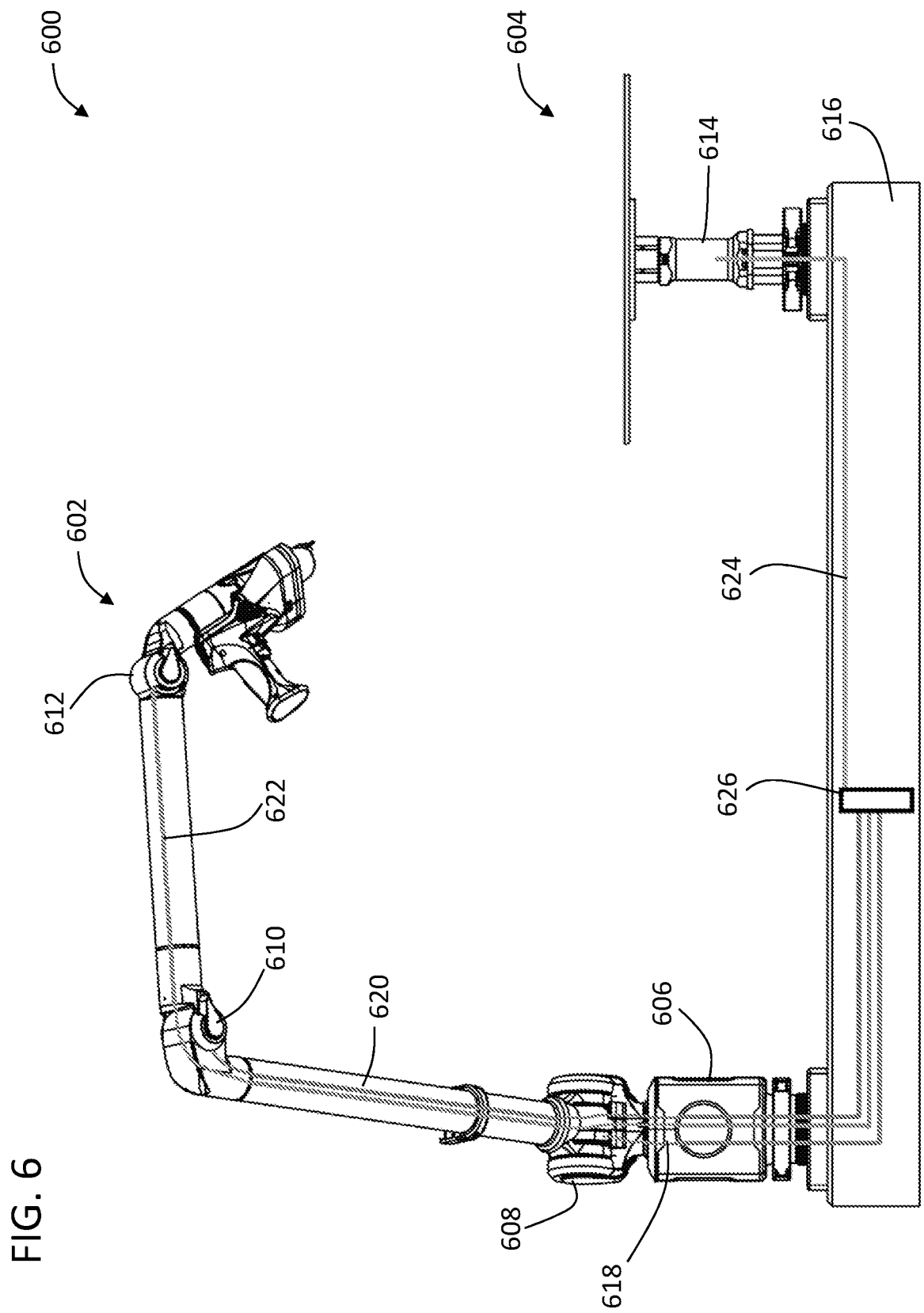
FIG. 6 is a schematic illustration of an auxiliary axis measurement system in accordance with an embodiment of the present disclosure.

Turning now to FIG. 6, a schematic illustration of an auxiliary axis measurement system 600 in accordance with an embodiment of the present disclosure is shown. The auxiliary axis measurement system 600 includes a primary axes assembly 602 and an auxiliary axis assembly 604, similar to that shown and described above. The primary axes assembly 602 includes a control unit 606 that is operably connected to and/or in communication with a plurality of bearing cartridges associated with movement of the primary axes assembly 602. For example, similar to the embodiments described above, the primary axes assembly 602 includes a first bearing cartridge 608, a second bearing cartridge 610, and a third bearing cartridge 612 disposed along an arm (or arm segments). The auxiliary axis assembly 604 includes an auxiliary axis bearing cartridge 614. The primary axes assembly 602 and the auxiliary axis assembly 604 are mounted to a table 616, such as an inspection table. Encoder systems of each of the bearing cartridges 608, 610, 612, 614 are operably connected to and/or in communication with a processing unit 626, which may be located within the table 616 and/or remote therefrom.

As shown, a first communication line 618 connects the first bearing cartridge 608 to the processing unit 626. A second communication line 620 connects the second bearing cartridge 610 to the processing unit 626. A third communication line 622 connects the third bearing cartridge 610 to the processing unit 626. A fourth communication line 624 connects the auxiliary axis bearing cartridge 614 to the processing unit 626. The first, second, and third communication lines 618, 620, 622 are configured to pass through internal portions of the primary axes assembly 602 without impeding movement and/or motion thereof (e.g., by the use of slip rings). In this embodiments, the first, second, and third communication lines 618, 620, 622 pass into and through the table 616 to the processing unit 626. The fourth communication line 624 is a line that extends from the auxiliary axis bearing cartridge 614, through the table 616, and to the processing unit 626, as schematically shown. The communication lines 618, 520, 622, 624 are arranged to operably connect encoder systems of the respective bearing cartridges 608, 610, 612, 614 to the processing unit 626 where data from the encoder systems can be collected, stored, processed, etc. to generate scanning data associated with movement of the bearing cartridges 608, 610, 612, 614 and thus of a target located or positioned on a platform of the auxiliary axis assembly 604.

As described above, the systems include various bearing cartridges and encoder systems located within a primary axes assembly and an associated auxiliary axis assembly. Advantageously, the present disclosure is directed to providing a synchronized or highly improved accuracy when making measurements of an object. For example, in accordance with some embodiments provided herein, an additional axis for measurement is added to a typical AACMM measurement system. That is, an auxiliary or remote axis is added to a typical system to provide improved measurement of a target. For example, in the above described and illustrative embodiments, the bearing cartridge and encoder system of the auxiliary multi-axis assembly adds an additional (integrated) axis to the AACMM system. Stated another way, the auxiliary multi-axis assembly essentially becomes an extension of the AACMM system itself. A kinematic relationship is provided between all of the various bearing cartridges/encoder systems.

To achieve such kinematic relationship, in an embodiment, the primary axes assembly and the auxiliary axes assembly are electrically integrated such that no separate computer is required for post-processing of data collected from the two systems. As such, the bearing cartridge/encoder system of the auxiliary multi-axis assembly is integrated into or part of the coordinate system of the primary axes assembly, and thus a single coordinate system is employed, without the need for making any adjustments or post-processing calculations to synchronize or align data collected from the remote/auxiliary axis (i.e., the auxiliary multi-axis assembly).

With reference again to FIGS. 5-6, the fourth communication line 524, 624 that connects the auxiliary axis assembly 504, 604 to the primary axes assembly 502, 602 provides a kinematic link between the typically separate systems. As such, the axis information provided at the auxiliary axis assembly becomes kinematically linked with the information collected at the primary axes assembly. Accordingly, simultaneous or nearly simultaneous information is collected at the arm axes and the auxiliary axis. In one non-limiting example, an AACMM may be configured with six (or seven) encoders, and a seventh (or eighth) coupled remote or auxiliary axis is provided at the auxiliary multi-axis assembly. In such configurations, real-time or near real-time synchronization is provided such that real-time processing can be achieved, without the need for post-processing of different coordinate systems to obtain measurements of a target. Real-time, as used herein, includes simultaneous and nearly simultaneous data collection and processing. For example, real-time may be performed at a 1 kHz operation with substantially simultaneous operation being performed within about 50 nanoseconds. Although a specific example time period of about 50 nanoseconds is provided herein, various embodiments and configurations may have shorter or longer time periods. In some embodiments, such as configurations having an arm with a turntable application, synchronization on the order of about 1-2 microseconds may be considered "real-time", and for external LLP's the synchronization may be on the order of about 10-100 microseconds, and for such applications this may be considered "real-time." Accordingly, the "real-time" application may be dependent upon the specific physical arrangement of parts, but is considered real-time or near real-time by those of skill in the art.

In an embodiment, the real-time or near real-time synchronization allows for measurement of a target on auxiliary axis while the target is moving relative to the auxiliary axis (e.g., rotation, translation, tilt, etc.) and a probe end (on a primary axes system) is also moving simultaneously. It should be appreciated that this provides advantages in reducing inspection time while potentially reducing errors during post-processing computations.

Although shown and described herein as an auxiliary axis provided at an auxiliary multi-axis assembly (e.g., rotary table, turntable, platform, etc.), the present disclosure is not limited thereto. For example, an auxiliary axis of the present disclosure may be provided at, but is not limited to, a linear rail, a conveyor, a tilt axis, a manual, automated, or motorized motor (e.g., internal motor), and/or an arm on a rotary table. That is, embodiments of the present disclosure are directed to an additional axis that is coupled into the buss and/or base processor of a multi-axis systems (e.g., an AACMM). Further, although described herein using an AACMM with a probe attached thereto, various types of probes or measurement systems can be employed without departing from the scope of the present disclosure. For example, tactile probes, laser line probes, cameras (e.g., single, stereo, etc.), structured light scanners, area scanners, etc.

Figure 7A:
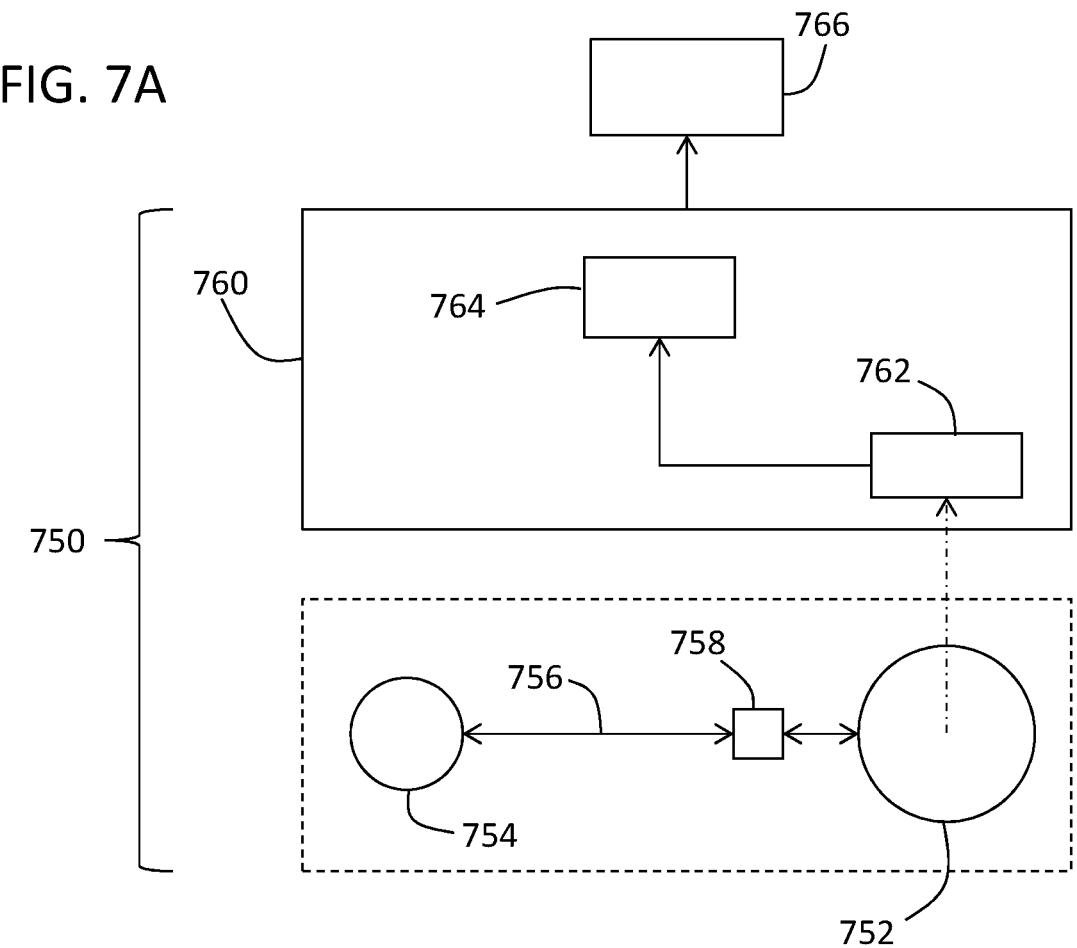
FIG. 7A is a schematic block diagram of an auxiliary axis measurement system in accordance with an embodiment of the present disclosure.

In operation, auxiliary axis measurement systems of the present disclosure are implemented by an integral computing or control system, rather than a post-processing system. For example, turning now to FIG. 7A, a schematic block diagram of an auxiliary axis measurement system 750 in accordance with an embodiment of the present disclosure is shown. The auxiliary axis measurement system 750 includes primary axes assembly 752 and an auxiliary axis assembly 754. The primary axes assembly 752 and the auxiliary axis assembly 754 may be similar to that shown and described above, and/or may be various other configurations thereof. The primary axes assembly 752 includes one or more primary axes (e.g., multi-axis AACMM), which are measured by respective encoder systems, and the auxiliary axis assembly 754 includes one or more auxiliary axes that are located at a device or position that is remote or separate from the primary axes assembly 752, which are measured by respective encoder systems.

The auxiliary axis assembly 754 is operably connected to and/or in communication with the primary axes assembly 752 through an auxiliary bus 756. The auxiliary bus 756 may be connected to an interface circuit 758 (e.g., a printed circuit board, integrated circuit, etc.). The interface circuit 758 is shown physically separate from the primary axes assembly 752, but there is merely for illustrative purposes, and in some embodiments, the interface circuit 758 may be part of and/or integral with the primary axes assembly 752. The auxiliary bus 756 and interface circuit 758 provide for a low or no latency connection such that data obtained at the auxiliary axis assembly 754 may be received at the primary axes assembly 752 in real-time or near real-time. In some embodiments, the auxiliary bus 756 is part of a bus of the primary axes assembly 752, such that the bus is merely an extension of the bus of the primary axes assembly 752 that connects the various encoder systems thereof.

The primary axes system 752 includes a control unit 760, which is shown schematically separate from the primary axes assembly 752, although in some embodiments the control unit 760 may be integral or part of the primary axes assembly 752 (e.g., as shown in FIGS. 3A-6 as a control unit of an AACMM). The control unit 760 receives data obtained from a plurality of encoder systems of the auxiliary axis measurement system 750. For example, the control unit 760 (or a processor system thereof) may be operably connected to and/or in communication with the one or more encoder systems of the primary axes system 752 and the one or more encoder systems of the auxiliary axis system 754.

The control unit 760 includes various electronics and components to enable capture of data or signals, processing thereof, storage of such data and/or of applications or programs, or other electrical components as will be appreciated by those of skill in the art. In accordance with some embodiments, the control unit 760 includes one or more processors and memory. The processor(s) are configured to control methods for operating the coordinate measuring system or aspects/parts thereof (e.g., the primary axes assembly 752 and the auxiliary axis assembly 754). The control methods may be stored in memory in non-transitory computer media, e.g., in the form of computer instructions, programs, applications, coding, etc. Embodiments disclosed herein may be implemented on any type of computer regardless of the platform being used. For example, a networked computer system may be employed. The networked computer system may include a processor, associated memory, a storage device, and numerous other elements and functionalities typical of computers as known in the art. The networked computer system may also include input means, such as a keyboard and a mouse, and output means, such as a monitor, display, etc. The networked computer system may be connected to a local area network (LAN) or a wide area network (e.g., the Internet) via a network interface connection. Those skilled in the art will appreciate that the input and output means may take many other forms. In some embodiments, the computer system may not be connected to a network. Further, those skilled in the art will appreciate that one or more elements of aforementioned computer system may be located at a remote location and connected to the other elements over a network. As such, a computer system, such as a networked computer system, and/or any other computer systems known in the art may be used in accordance with embodiments disclosed herein.

Data from the various encoder systems may be collected in a storage unit 762 of the control unit 760. The collected data may be stored temporarily or permanently stored. A processing unit 764 will process the collected data to obtain a set of 3D coordinate measurements of a target that is measured by the auxiliary axis measurement system 750 (e.g., data collected from both the primary axes assembly 752 and the auxiliary axis assembly 754). Because a single coordinate system is employed, an efficient mechanism for making measurements of a target is achieved.

The data may then be transmitted to an external computing system 766 for post-processing tasks, such as generating a three dimensional model of a measured or scanned target. However, as provided by embodiments of the present disclosure, the external computing system 766 is not required to perform any post-processing calibration and/or synchronization between data obtained from the primary axes assembly 752 and the auxiliary axis assembly 754, as this is performed within the auxiliary axis measurement system 750.

Figure 7B:
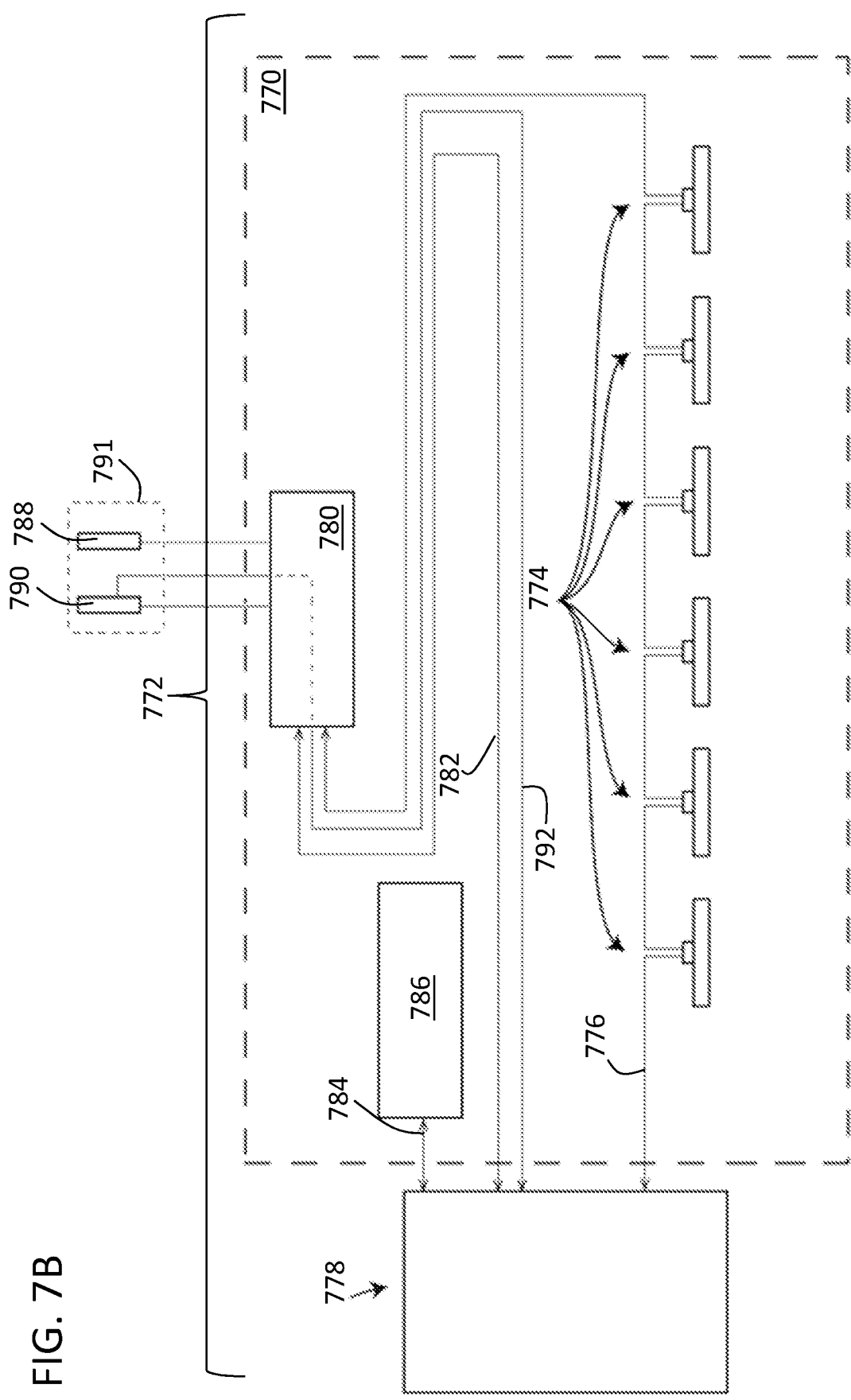
FIG. 7B is a schematic diagram of electrical elements in an auxiliary axis measurement system in accordance with an embodiment of the present disclosure.

Turning now to FIG. 7B, a schematic diagram of electrical elements 770 in an auxiliary axis measurement system 772 in accordance with an embodiment of the present disclosure is shown. The electrical elements 770 include a plurality of angular encoders 774 attached by a first bus 776 to a base processor electronics 778 on one end, and to primary axes assembly electronics 780 on the other end. In some embodiments, electrical signals obtained from a probe assembly (e.g. a probe on an end of a primary axis assembly) pass through the first bus 776 and/or a second bus 782 to the base processor electronics 778. Further, as shown, a third bus 784 operably connects the base processor electronics 778 to auxiliary axes assembly electronics 786. Although shown as three separate buses, those of skill in the art will appreciate that a single bus may be arranged to operably connect the base processor electronics 778 to each of the encoders 774, the primary axes assembly electronics 780, and the auxiliary axes assembly electronics 786.

When directed by an operator (e.g., user or computer controller), the primary axes assembly electronics 780 returns encoder readings from the encoders 774 to the base processor electronics 778 at regular intervals set by a capture signal sent from the base processor electronics 778. Simultaneously, the auxiliary axes assembly electronics 786 will return encoder readings obtained from encoders of the auxiliary axes assembly. At each capture interval, angular readings are returned to the base processor electronics 778, thereby enabling calculation of a position of a probe or other component (e.g., a portion of the primary axes assembly) relative to the auxiliary axes assembly and information from the auxiliary axes assembly itself. In some embodiments, a trigger signal may be generated based on input from a user or control computer, with the trigger signal triggering generation of the capture signal.

The capture signal generated at the base processor electronics 778 may be generated or triggered by a signaling unit of the base processor electronics 778. The signaling unit, in some embodiments, will broadcast capture signals and receive trigger signals (e.g., from an input by a user or control computer). In an embodiment, the capture signals and trigger signals travel along the buses 776, 782, 784. The encoder data received from the encoders 774 and/or encoders of the primary and/or auxiliary axes assemblies are synchronized to the capture signal, which in an embodiment has a rate of around one kilohertz.

As illustratively shown, each encoder 774 is attached to the first bus 776 by a T-connector. That is each encoder 774 connects to a corresponding T-cable of the first bus 776. Cable connectors on each end of the T-cable attach to cable connectors on adjacent T-cables along the first bus 776. In this way, angle information may be transferred from each encoder 774 through the first bus 776 to the base processor electronics 778 for further processing. As noted, the transmitted encoder data is synchronized to the capture signal. In some embodiments, the encoders 774 may continue to transmit encoder data (e.g., angle readings) to the base processor electronics 778 even if one or more of the other encoders 774 are disconnected from the first bus 774.

In some embodiments, the encoders 774 may be arranged along and/or as part of an AACMM, with the first and second bus 774, 782 disposed there along. In some embodiments, a tactile probe 788 and/or an LLP 790 (e.g., collectively or individually a probe device 791) may be arranged at an end of the AACMM. In embodiments that include the LLP 790, an Ethernet bus 792 may connect to the LLP 790 through an arm-to-handle connector. The Ethernet bus 792, which may be a gigabit Ethernet bus or other high speed connection, may enable transmission of a high speed signal through slip rings of the AACMM, along with the encoder signals from the encoders 774, to the base processor electronics 778. The Ethernet signal passes back into the base processor electronics 778 through one or more of the busses 774, 782. Accordingly, data obtained at the probe device 791 may be transmitted along the busses 774, 782. In some non-limiting embodiments, the tactile probe 788 may be a tactile or touch probe. It should be noted that the probe assembly/LLP arrangement may be varied and other types of devices may be operably connected to the primary axes assembly electronics 780, such as for imaging and/or measuring a target, as described herein.

In some embodiments that incorporate the LLP 790, the LLP 790 may synchronized to the capture signal used to capture encoder data, as described above. In some such embodiments, the capture signals may be sent from an arm-end processor to an arm-to-handle connector (e.g., part of the primary axes assembly electronics 780) to synchronize measured values obtained from accessories such as the probe device 791 (e.g., an LLP 790 and/or a tactile probe 788) with the encoder data (e.g., angular readings) obtained by the encoders 774.

Although shown and described above with a primary axes system being arranged as an AACMM, such configuration is merely for explanatory and example purposes, and other arrangements are possible without departing from the scope of the present disclosure. That is, various different configurations that align and/or synchronize various different axis components into a single system that collects data in real-time or near real-time from multiple axes, with at least one auxiliary axis, are possible.

Figure 8:
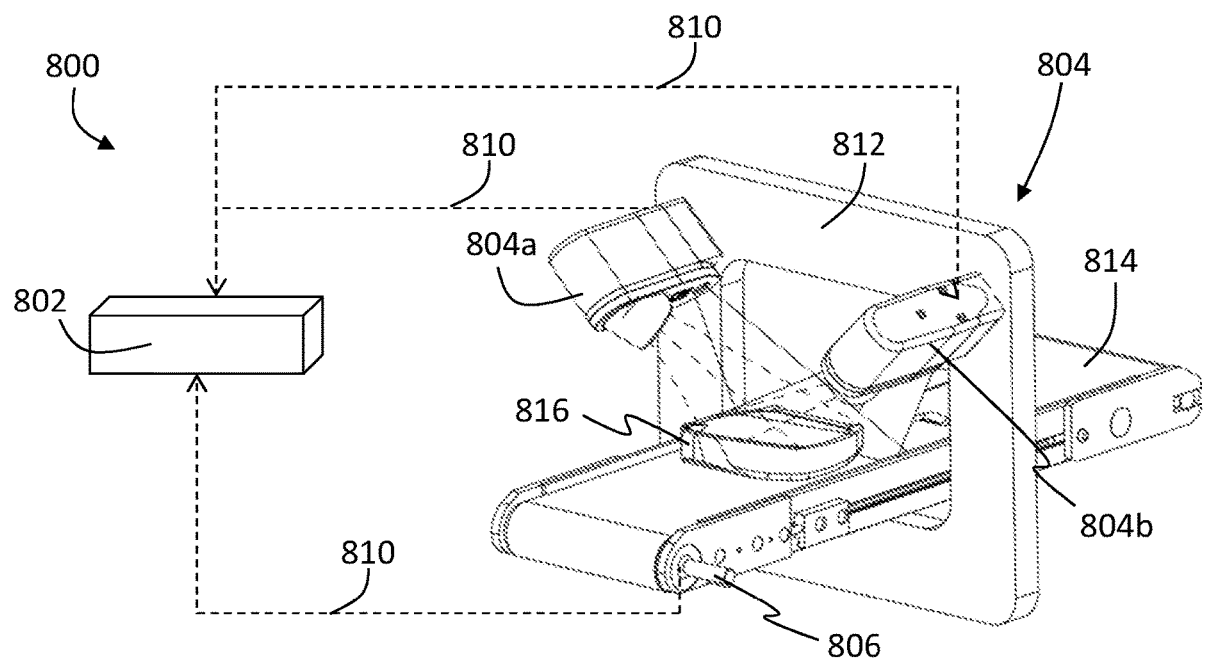
FIG. 8 is a schematic illustration of an auxiliary axis measurement system in accordance with an embodiment of the present disclosure.

For example, turning now to FIG. 8, a schematic illustration of an auxiliary axis measurement system 800 in accordance with an embodiment of the present disclosure is shown. The auxiliary axis measurement system 800 may include various components that can incorporate one or more bearing cartridges having associated encoders and/or encoder systems. The auxiliary axis measurement system 800 includes a control unit 802 that is operably connected, in this embodiment, to a first primary axes assembly 804 (e.g., having a first measuring device 804a and a second measuring device 804b) and an auxiliary axis assembly 806 (having at least one associated encoder). In some embodiments, the first and second measurement devices 804a, 804b may be fixed in position (e.g., as laser line probes) that do not include encoders because no rotation thereof will occur. The control unit 802 is configured to control operation of the primary axes assembly 804 and the auxiliary axis assembly 806 and can transmit and receive information, commands, data, power, etc. therebetween. As shown, the control unit 802 is connected to or in communication with the primary axes assembly 804 and the auxiliary axis assembly 806 through communications connections 810 which may form a common bus of the auxiliary axis measurement system 800.

In this illustrative embodiment, the primary axes assembly 804 includes a first laser line probe 804a mounted to a frame 812 at a first position and a second laser line probe 804b mounted to the frame 812 at a second position, with the laser line probes 804a, 804b optionally rotatable relative to the frame 812. The auxiliary axis assembly 806 is part of a conveyor 814. A target 816 (e.g., scanned object) can be moved on the conveyor 814 through the frame 812 and the measuring device 804a, 804b of the primary axes assembly 804 may make measurements associated with the target 816. Simultaneously, an encoder of the auxiliary axis assembly 806 may detect a translational position of the target 816 relative to the primary axes assembly 804.

Figure 9:
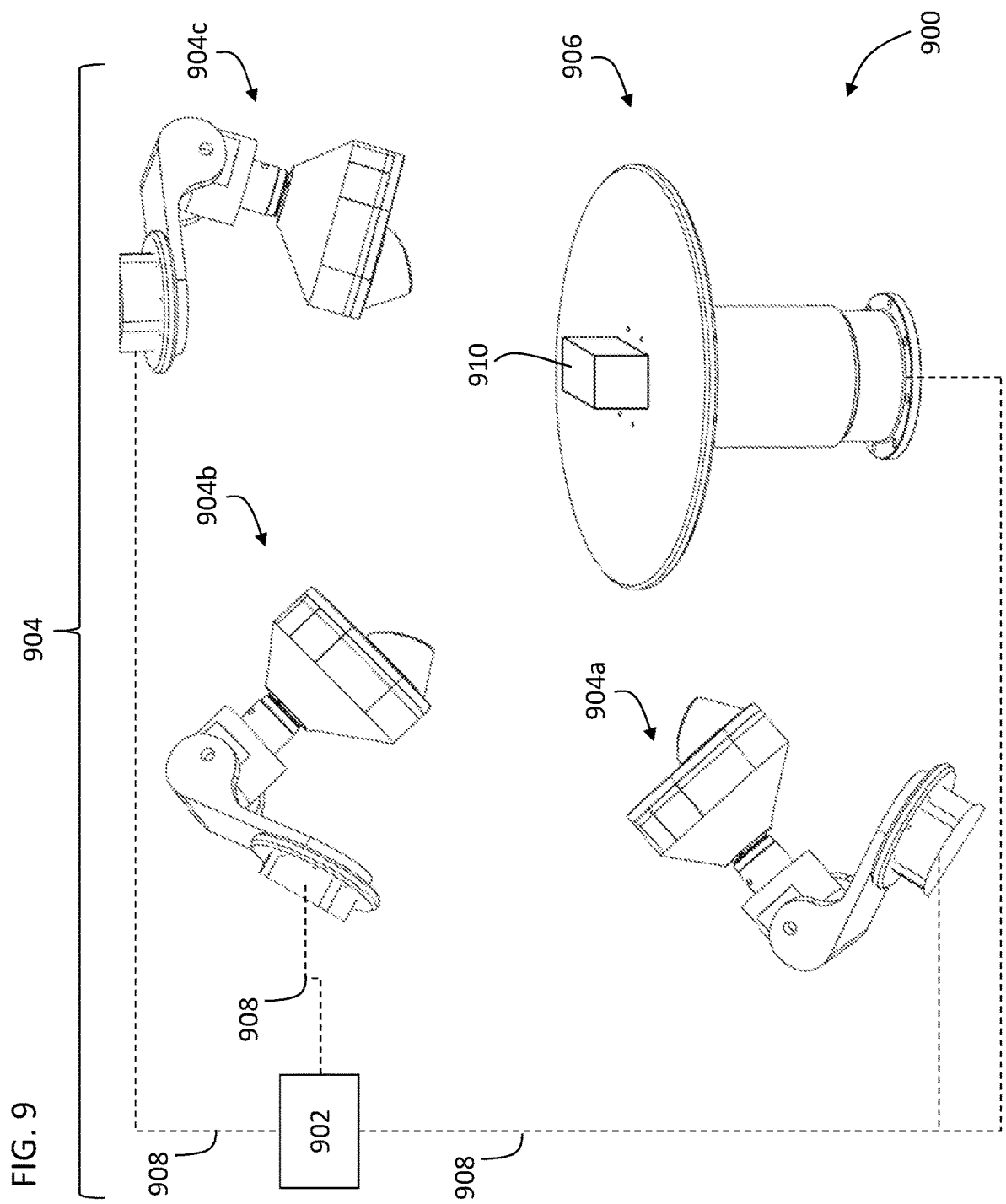
FIG. 9 is a schematic illustration of an auxiliary axis measurement system in accordance with an embodiment of the present disclosure.

Turning now to FIG. 9, a schematic illustration of an auxiliary axis measurement system 900 in accordance with an embodiment of the present disclosure is shown. As shown, the auxiliary axis measurement system 900 includes a control unit 902 that is operably connected, in this embodiment, to a primary axes assembly 904 having a first measuring device 904a, a second measuring device 904b, and a third measuring device 904c. An auxiliary axis assembly 906 is shown as a turntable assembly. Each of the measuring devices 904a, 904b, 904c and the auxiliary axis assembly 906 include one or more bearing cartridges and associated encoders and/or encoder systems. The control unit 902 is configured to control operation of the measuring devices 904a, 904b, 904c and the auxiliary axis assembly 906 and can transmit and receive information, commands, data, power, etc. therebetween. As shown, the control unit 902 is connected to or in communication with the measuring devices 904a, 904b, 904c and the auxiliary axis assembly 906 through a communications connections 908 which may be formed as a common bus between the elements of the auxiliary axis measurement system 900.

In this illustrative embodiment, the measuring devices 904a, 904b, 904c are movably mounted on a respective bearing cartridges such that the measuring devices 904a, 904b, 904c can image or otherwise obtain information associated with a target 910 located on the auxiliary axis assembly 906. As shown, the target 910 is placed on a platen of the auxiliary axis assembly 906 and can be rotated thereon. The control unit 902 can control operation and movement of the primary axes assembly 804 and the auxiliary axis assembly 806 to enable obtaining information associated with the target 910. Advantageously, any and all of the primary axes assembly 804 and the auxiliary axis assembly 806 (or portions thereof) can be moved or rotated simultaneously, and embodiments provided herein enable the control unit 902 to obtain 3D coordinate measurement information of the target 910 without post-processing procedures.

The above shown and described embodiments are not to be limiting, and are merely provided as example. It will be appreciated that area scanners, hand scanners, and other configurations of scanners and/or imagers may incorporate embodiments of the present disclosure.

It will be appreciated that a calibration process of the primary axes assembly and the auxiliary axis assembly is required for accurate readings. However, such calibration may be substantially similar to the calibration of a given encoder within the primary axes assembly with any other encoder of the primary axes assembly. This is because the auxiliary axis assembly, in accordance with embodiments of the present disclosure, is an extension of the primary axes assembly and not separate therefrom.

Figure 10:
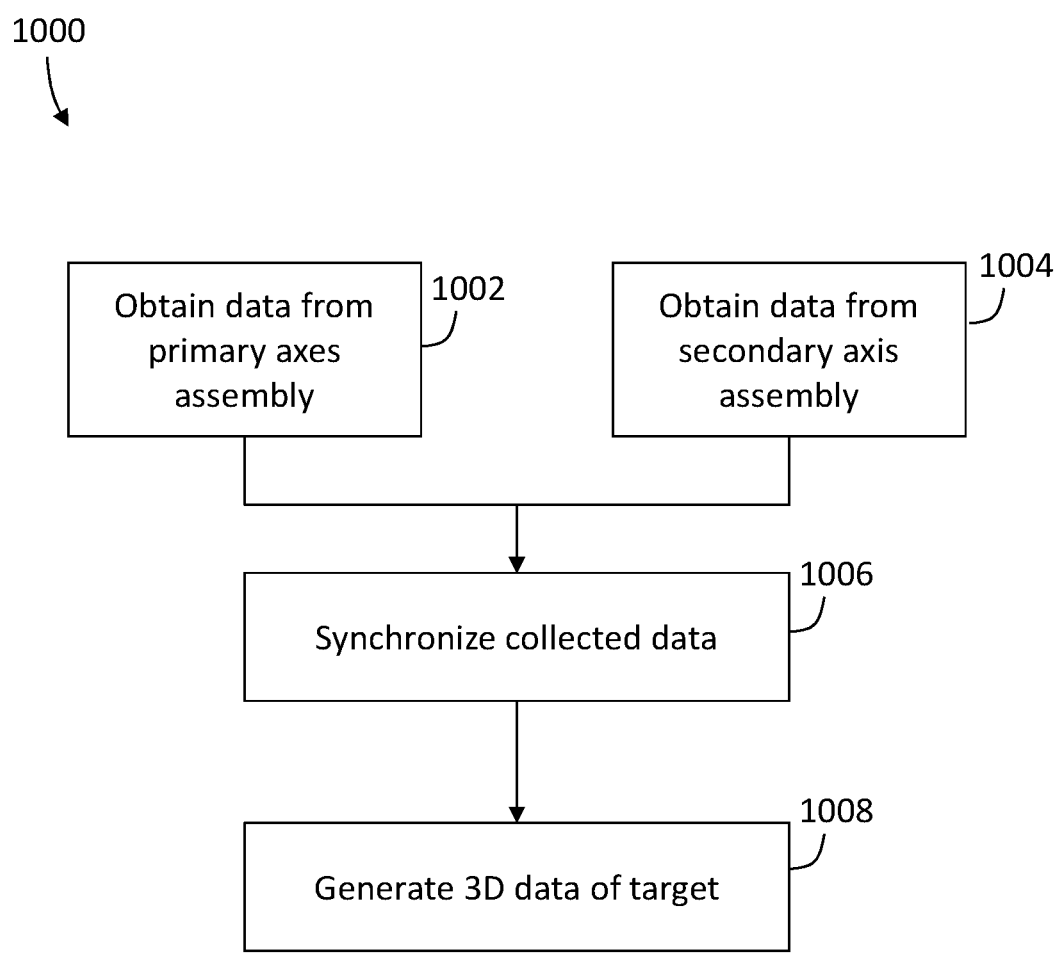
FIG. 10 is a flow process in accordance with an embodiment of the present disclosure.

Turning now to FIG. 10, a flow process 1000 in accordance with an embodiment of the present disclosure is shown. The flow process 1000 is performed at a control unit that is operably connected to a primary axes assembly and an auxiliary axis assembly, such as shown and described above. In some embodiments, the control unit may be part of the primary axes assembly, as described above with respect to some embodiments.

At block 1002, the control unit obtains data from the primary axes assembly. The data may be obtained from one or more encoders of the primary axes assembly to represent movement of the primary axes assembly or parts thereof within a primary assembly coordinate system. The primary axes assembly may be used to scan, image, or otherwise measure a target. The data obtained from the encoders enables precise measurements of the target.

At block 1004, which is performed simultaneously or near simultaneously with block 1002, the control unit obtains data from the auxiliary axis assembly. The data may be obtained from one or more encoders of the auxiliary axis assembly to represent movement of the auxiliary axis assembly or parts thereof within the primary assembly coordinate system. The auxiliary axis assembly may be used to scan, image, or otherwise measure the target. The data obtained from the encoders enables precise measurements of the target.

At block 1006, the data obtained from the primary axes assembly and the auxiliary axis assembly may be synchronized, to correct for any delays of data collection, e.g., on the order of nanoseconds. For example, in some embodiments, the compensation and/or synchronization may be performed in less than 100 nanoseconds, or less than 50 nanoseconds.

At block 1008, the control unit generates three dimensional data of the target, such as a 3D point cloud or other data that represents a model of the target. It is noted that the generation of the 3D data is performed within the control unit, and thus no post-processing is required in accordance with the flow process 1000 of the present disclosure.

To achieve the real-time or near real-time synchronization and integrated auxiliary axis system, a compensation procedure may be performed. In one non-limiting example using an AACMM (primary system) and a rotary table (auxiliary system) the compensation and synchronization will be described. In this embodiment, the AACMM and the rotary table are rigidly mounted to desired location. In this configuration (i.e., using these components), the distance between the AACMM and the rotary table should not be more than 110% of the reach of the AACMM.

Software is then employed to prompt a user to work through a series of steps to achieve the desired synchronization of the primary and auxiliary systems. In this example, a hard probe may be installed or attached to the AACMM. To compensate the hard probe, the process will prompt the user to place the hard probe in a compensation feature (e.g., cone) on the rotary table (e.g., as shown and described below). It will be appreciated that the probe should not come out of the compensation feature while collecting data. The user may then rotate the rotary table (e.g., manually or automated) with the hard probe engaged with the compensation feature. As the rotary table is rotated, the system will collect data. For example, data points may be collected approximately every 1 mm of motion. The rotary table will be rotated such that the hard probe is swept through an arc (up to a full circle depending on table distance), and data points will be collected. Once the data collection is complete, a circle will be fit to the points collected. The circle center and circle normal will define the axis of rotation of the rotary table.

The residuals of the circle fit will be displayed to the user as an indication of system accuracy. If the system accuracy does not meet a predetermined or required specification or level of accuracy, the process may be repeated. However, if the compensation process generates data within the predetermined or required specification or level of accuracy, the circle center and circle normal will be saved to the primary system (e.g., to the AACMM) and, in some embodiments, added to a compensation log. The compensation log allows a user to review a history of compensations and system performance.

With the data from the rotary table obtained and saved, a transformation may be performed to align all data points into a single coordinate system. For example, in some embodiments, all data points may be transformed to the coordinate system of the AACMM. In other embodiments, the auxiliary system (e.g., the rotary table) may form the basis of the common coordinate system. In one non-liming example, the common coordinate system may be based on a rotation matrix defined by the axis of rotation and encoder angle of the rotary table.

Compensation of the system, e.g., synchronization of the primary and auxiliary systems, may take various forms. For example, compensation may be employed to account for table wobble. Further, encoder data may be used to indicate the center of gravity of a target or scanned part. In some such examples, a software-aided method may be employed to aid the user in placing the center of gravity of the target on the axis of rotation of the auxiliary system (e.g., on a rotary table). In some embodiments, the auxiliary system (e.g., rotary table) may be used as a compensation artifact so that all parameters of the primary system can be compensated by a user. Then, if the primary system has a mechanical shift that causes a loss in accuracy, the compensation can enable correction it without requiring substantial adjustment of the physical parts of the primary system.

Figure 11A:
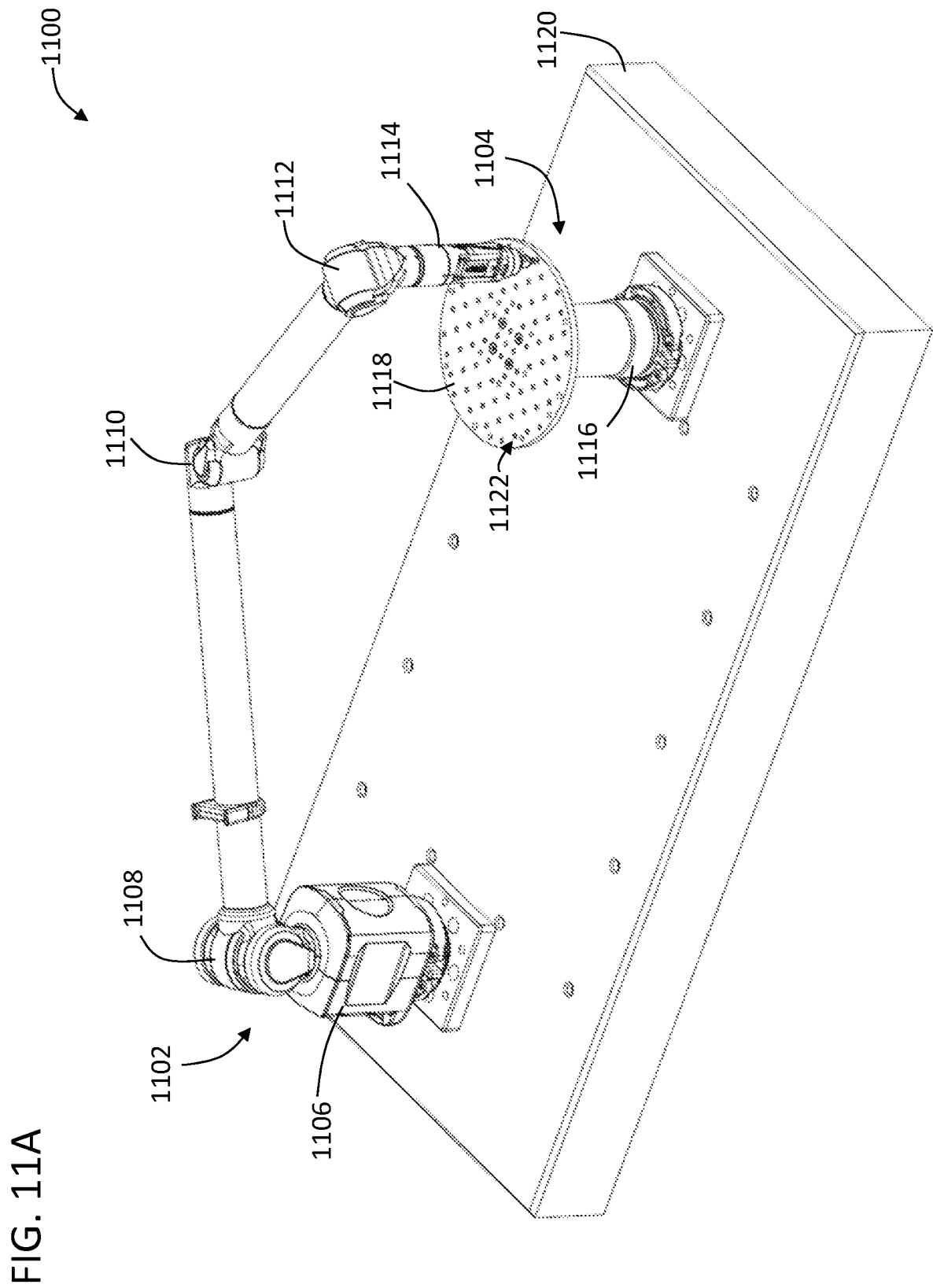
FIG. 11A is an isometric illustration of an auxiliary axis measurement system in accordance with an embodiment of the present disclosure.
Figure 11B:
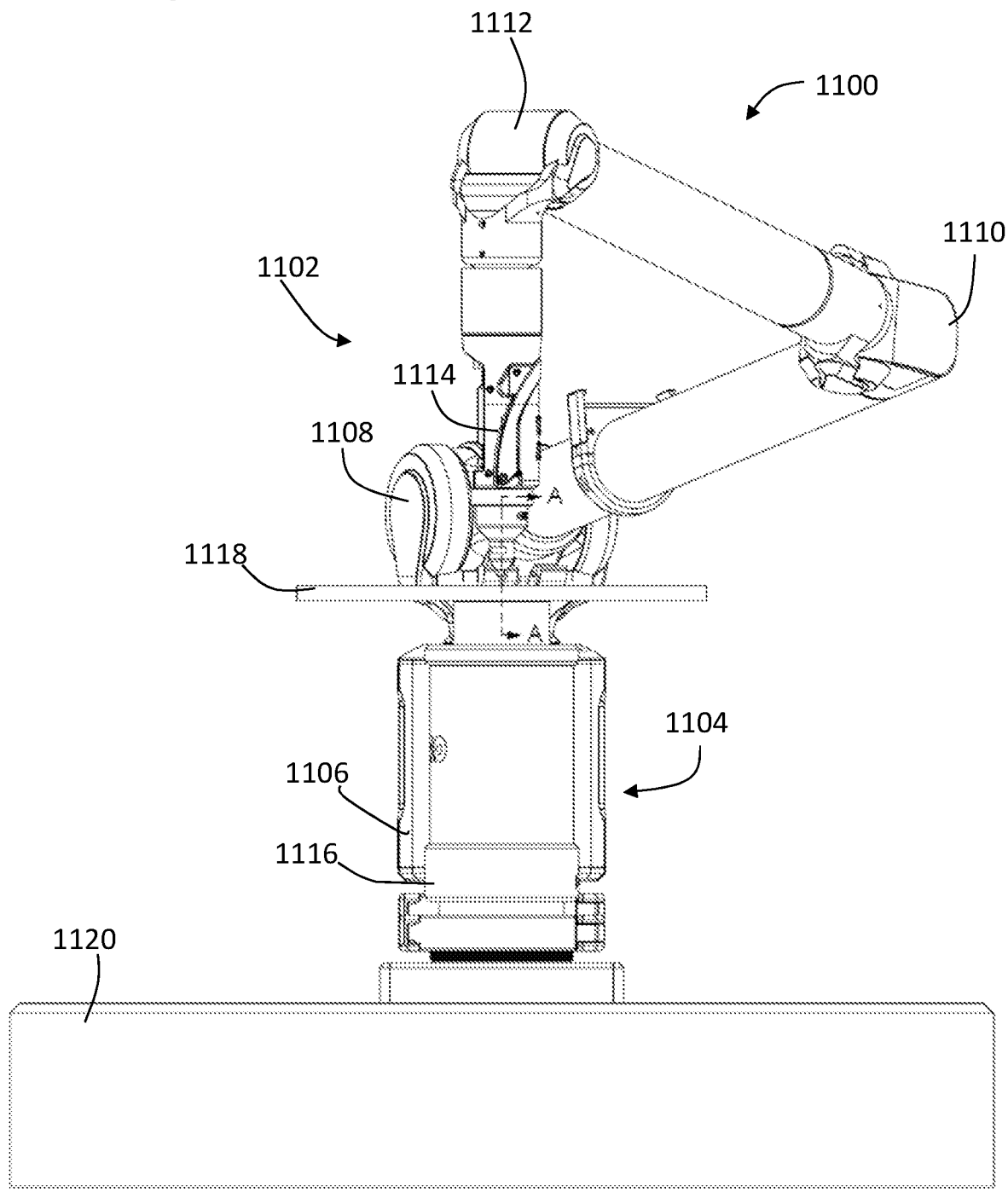
FIG. 11B is an elevation view of the auxiliary axis measurement system of FIG. 11A.
Figure 11C:
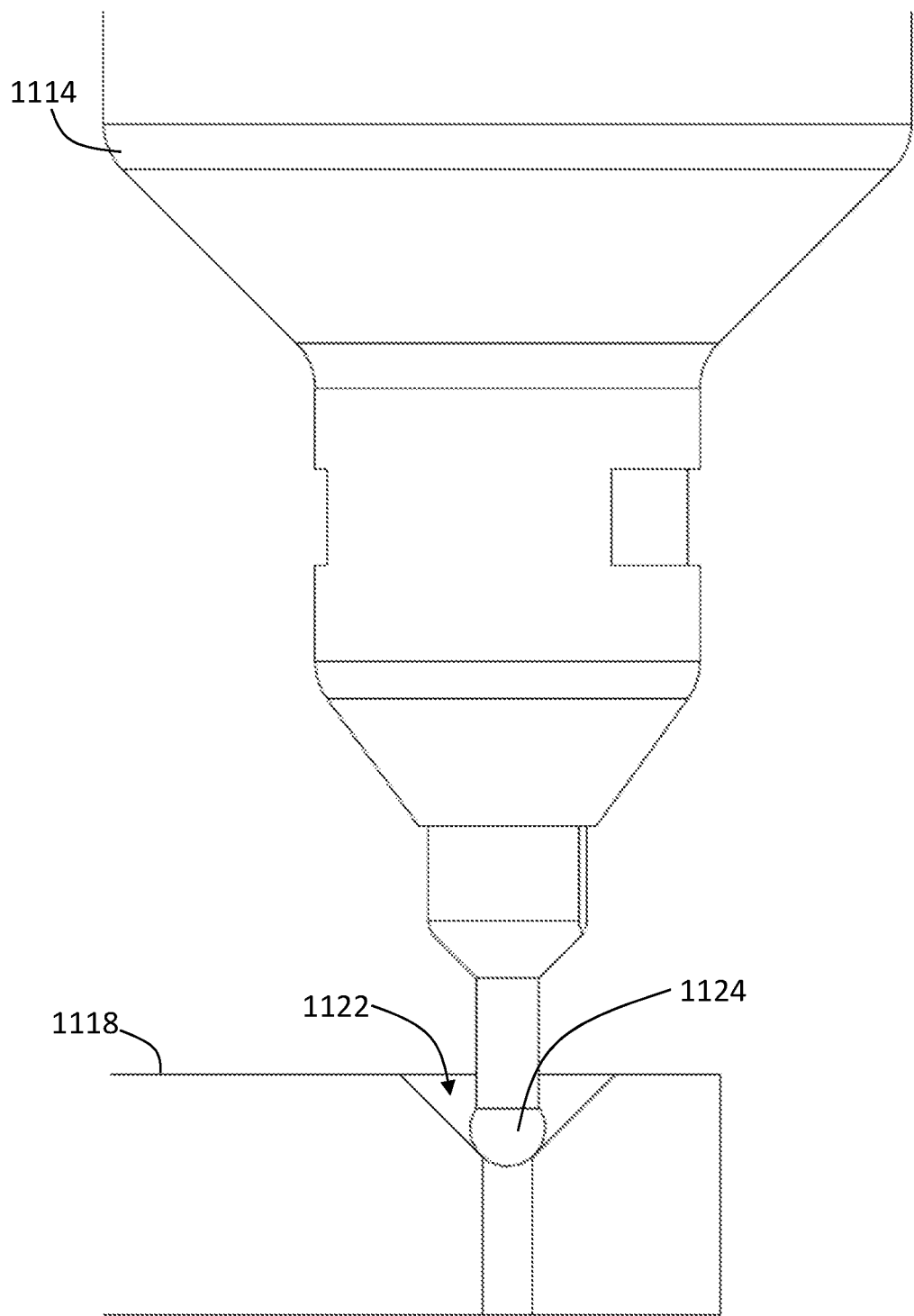
FIG. 11C is a cross-sectional illustration of the auxiliary axis measurement system of FIGS. 11A-11B, as viewed along the line A-A shown in FIG. 11B.

Turning now to FIGS. 11A-11C, schematic illustrations of an auxiliary axis measurement system 1100 in accordance with an embodiment of the present disclosure are shown. FIG. 11A is an isometric illustration of the auxiliary axis measurement system 1100. FIG. 11B is an elevation view of the auxiliary axis measurement system 1100. FIG. 11C is a cross-sectional illustration of the auxiliary axis measurement system 1100 as viewed along the line A-A shown in FIG. 11B.

The auxiliary axis measurement system 1100 includes a primary axes assembly 1102 and an auxiliary axis assembly 1104, similar to that shown and described above. The primary axes assembly 1102 includes a control unit 1106 that is operably connected to and/or in communication with a plurality of encoder systems associated with movement of the primary axes assembly 1102. For example, similar to the embodiments described above, the primary axes assembly 1102 includes a first bearing cartridge 1108, a second bearing cartridge 1110, and a third bearing cartridge 1112 disposed along an arm (or arm segments), with each bearing cartridge 1108, 1110, 1112 having one or more associated encoder systems. A probe assembly 1114 is located on an end of the primary axes assembly 1102. The auxiliary axis assembly 1104 includes an auxiliary axis bearing cartridge 1116 that is arranged relative to a rotary table 1118 of the auxiliary axis assembly 1104.

The primary axes assembly 1102 and the auxiliary axis assembly 1104 are mounted to a table 1120, such as an inspection table. Encoder systems of each of the bearing cartridges 1106, 1110, 1112, 1116 are operably connected to and/or in communication with a processing unit, which, in this embodiment, may be part of the control unit 1106 of the primary axes assembly 1102.

As shown, the rotary table 1118 includes one or more compensation features 1122. The compensation feature 1122 may be any structure or geometry to enable engagement with a probe end 1124, as shown in FIG. 11C. For example, as shown in FIG. 11C, the compensation feature 1122 is a cone-shaped depression in the surface of the rotary table 1118. The probe end 1124, as shown, is rounded, and thus the probe end 1124 will contact the surface of the compensation feature 1122 and engage therewith. Then, as the rotary table 1118 is rotated, the probe assembly 1114 will be moved with the rotation thereof. As the probe assembly 1114 and the rotary table 1118 are rotated, data is collected at the encoders of the bearing cartridges 1106, 1110, 1112, 1116. This data is collected and synchronized such that a single common coordinate system can be formed, as described above. Accordingly, a single common coordinate system with one or more integrated auxiliary axes can be achieved.

Although shown and described with a specific arrangement, various other types of compensation may be employed without departing from the scope of the present disclosure. For example, different types of probes may be employed for the primary system, different geometry compensation features may be employed, the auxiliary and primary systems may be switch for which includes the probe and the compensation features, etc. That is, the presently described example is merely for example and illustrative purposes and is not to be limiting.

As described herein, the various different single- or multi-axis systems are integrated into a single auxiliary axis measurement system. Such integration of external axes, in some embodiments, may enable computer controlled operation and movement, and subsequent precise, real-time or near real-time measurement by encoders that are part of the assemblies. Advantageously, even with all axes being moved simultaneously, embodiments provided herein can enable real-time or near real-time measurement of a target without post-processing to be performed.

The systems described here can use integrated or external control systems that provide for synchronization and real-time data collection and correlation. In some embodiments, the control may be electronically integrated into an AACMM or may be integrated into a computer or stand-alone controller that reads or receives data and signals from both the primary and auxiliary systems and integrates the data in real time.

The communication line that connects to the auxiliary system is, in some embodiments, and extension of a primary system bus and thus the auxiliary axis system may be treated as an additional axis to form a single, extended system. The synchronization may be done at the controller using an industrial bus, a computer clock (e.g., software synchronization), and may be wired or wireless.

Although shown in FIGS. 2A-2C, with a fixed connection between the bearing cartridge 206 and the platform 208, such arrangement is not to be limiting. For example, in some embodiments, the auxiliary multi-axis assembly (or even the primary axis assembly) may have a releasable or quick-connect system to enable exchange of platforms and/or objects to be scanned/measured.

Figure 12B:
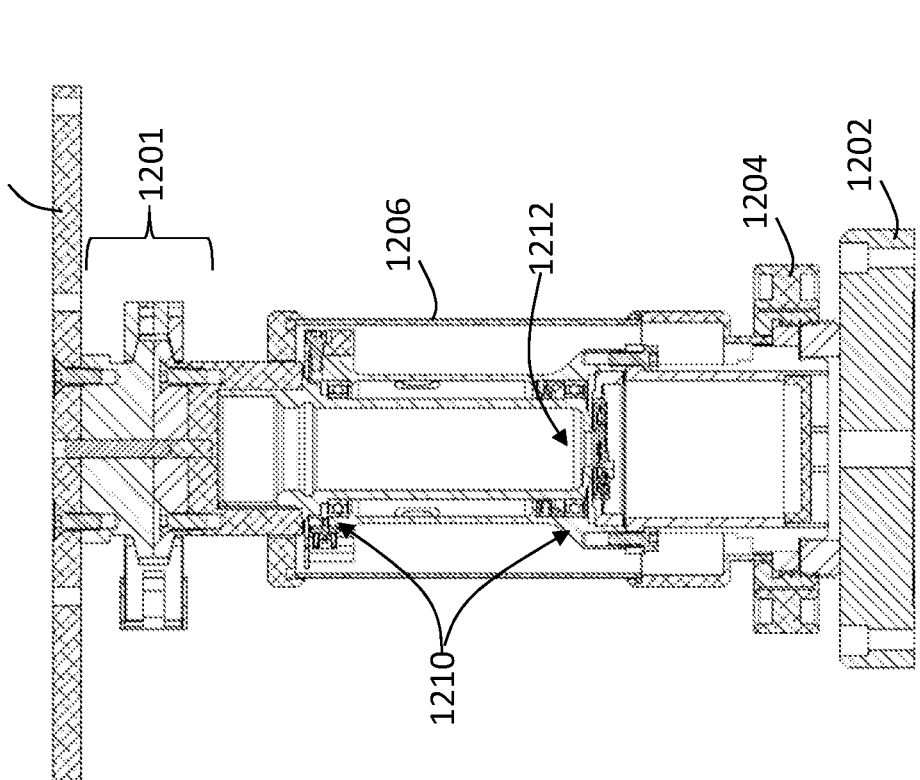
FIG. 12B is a cross-sectional view of the portion of the auxiliary multi-axis assembly of FIG. 12A, as viewed along the line B-B of FIG. 12A.
Figure 12A:
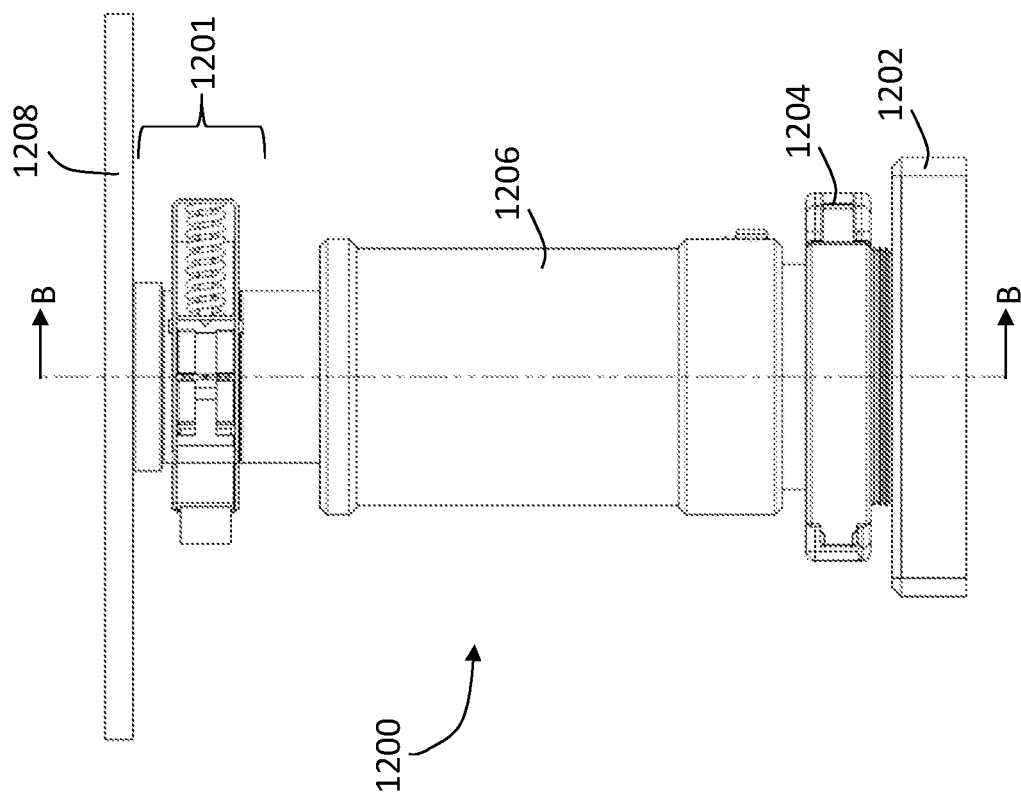
FIG. 12A is a side elevation illustration of a portion of an auxiliary multi-axis assembly in accordance with an embodiment of the present disclosure.
Figure 12C:
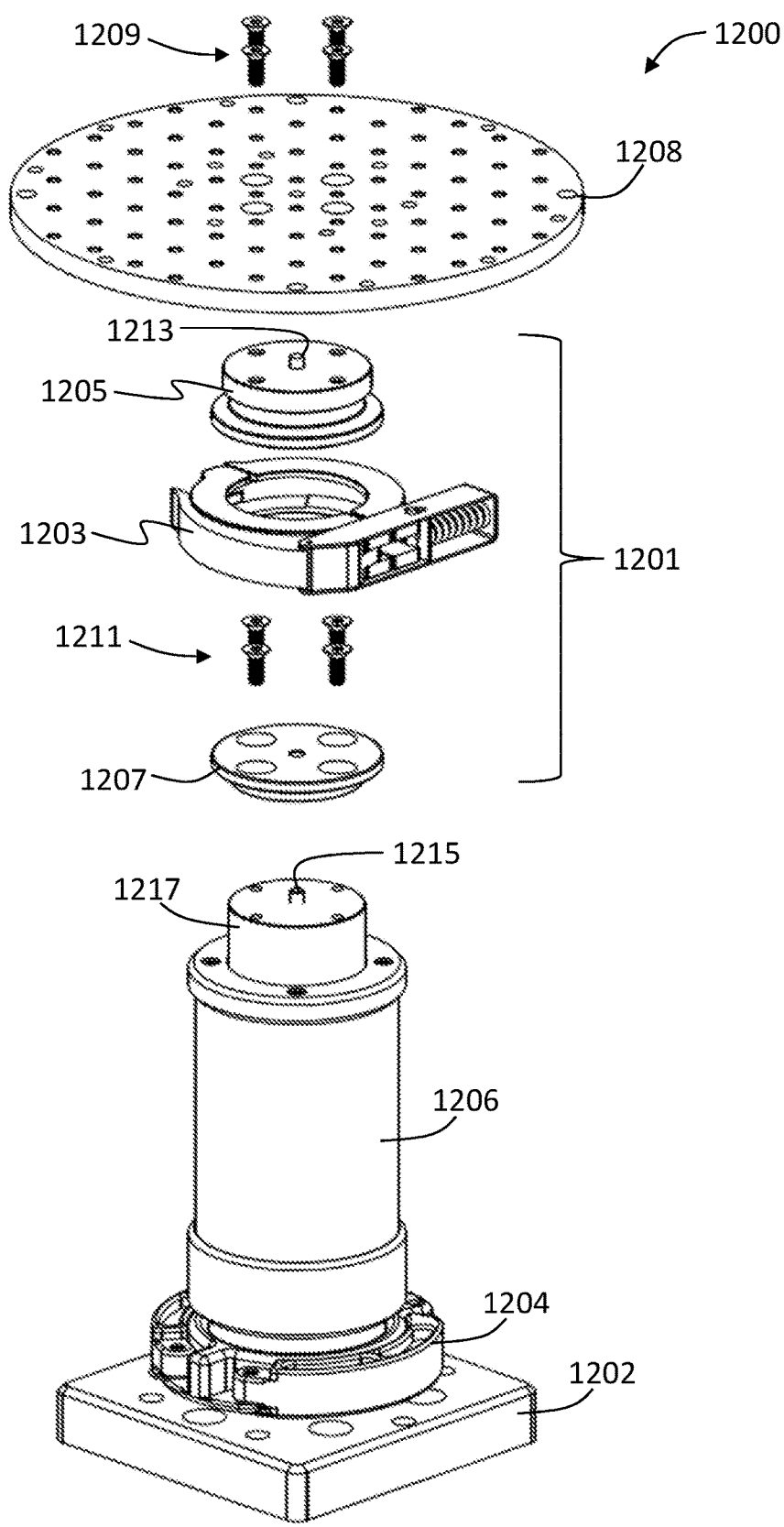
FIG. 12C is an exploded illustration of the portion of the auxiliary multi-axis assembly of FIG. 12A.

For example, turning now to FIGS. 12A-12C, schematic illustrations of a portion of an auxiliary multi-axis assembly 1200 in accordance with an embodiment of the present disclosure are shown. FIG. 12A is a side elevation illustration of the auxiliary multi-axis assembly 1200, FIG. 12B is a cross-sectional view of the auxiliary multi-axis assembly 1200 as viewed along the line B-B of FIG. 12A, and FIG. 12C is an exploded illustration of the auxiliary multi-axis assembly 1200. As described herein the auxiliary multi-axis assembly 1200 may be operably connected to an AACMM, such as that shown and described above, and may provide one or more additional axes to the measurement system to provide precise measurement of a target, which may be located on the auxiliary multi-axis assembly 1200.

The auxiliary multi-axis assembly 1200 includes a base 1202 and an attachment device or mounting device 1204 configured on the base 1202. A bearing cartridge 1206 is connected to the base 1202 by the mounting device 1204. The bearing cartridge 1206 (or a component housed therein) is rotatable to drive rotation of a platform 1208 (e.g., a plate or other target support/mounting structure). The bearing cartridge 1206 may be operably connected to and in communication with an electronic data processing system that includes various electronic and/or processing components. For example, in one non-limiting embodiment, a processing system may be located remote from and in communication (e.g., wired or wirelessly) with the bearing cartridge 1206. The processing system is configured to process data received from the auxiliary multi-axis assembly 1200 (e.g., the bearing cartridge 1206) as well as data representing other assembly parameters to support three-dimensional (3-D) positional calculations and a user interface processing system that includes an on-board operating system, a touch screen display, and resident application software that allows for relatively complete metrology functions to be implemented using the auxiliary multi-axis assembly 1200.

The bearing cartridge 1206 includes one or more bearings 1210 to enable rotation of the platform 1208. The rotation of the platform 1208 may be manual or may be driven by a motor or other driving mechanism (e.g., automated). The rotation of the platform 1208 is measured by an encoder system 1212, which may be similar to the encoders employed in the bearing cartridges described above. In some embodiments, the platform 1208 may additionally (or alternatively) be arranged to tilt and/or translate, with such motion monitored by one or more associated encoder systems, as will be appreciated by those of skill in the art. Additionally, although shown with a specific platform size and shape, those of skill in the art will appreciate that any type, size, and/or shape of platform may be employed without departing from the scope of the present disclosure. The platform is merely a portion of the auxiliary multi-axis assembly 1200 to support, attach to, connect to, or otherwise hold a target to be measured by a measurement system as shown and described herein.

In this embodiment, the platform 1208 removably connects or attaches to the bearing cartridge 1206 using a releasable connector assembly 1201. The releasable connector assembly 1201 provides for easy connection and separation of the platform 1208 from the bearing cartridge 1206. Further, the releasable connector assembly 1201 enables interchangeability or exchangeability of different platforms 1208 that may be attached to the bearing cartridge 1206.

As shown, the releasable connector assembly 1201 includes a releasable locking element 1203, a first connector element 1205, and a second connector element 1207. The releasable locking element 1203 is configured to releasable connect the first connector element 1205 to the second connector element 1207. In some embodiments, the releasable locking element 1203 may be a clamp or other engageable/disengageable device that can securely engage with the first and second connector elements 1205, 1207. In some embodiments, the releasable locking element 1203 may have a channel or other conical surface arranged to engage with surfaces (e.g., flanges) of the first and second connector elements 1205, 1207. The releasable locking element 1203 may be, without limitation, toggle clamps, C-clamps, D-clamps, hose clamps, kant-twist clamps, or other types of adjustable clamps, with or without hinges and with or without biasing elements for pressure/compression, as will be appreciated by those of skill in the art.

As shown, the platform 1208 may be connected or attached to the first connector element 1205 by one or more fasteners 1209. Similarly, the bearing cartridge 1206 may be connected or attached to the second connector element 1207 by one or more fasteners 1211. Although shown with the platform 1208 separate from the first connector element 1205 and the bearing cartridge 1206 separate from the second connector element 1207, in some embodiments, one or both of the platform 1208 and the bearing cartridge 1206 may be integrally formed with the respective connector element 1205, 1207.

When the connector elements 1205, 1207 are separate from the respective platform 1208 or bearing cartridge 1206, an alignment pin 1213, 1215 may be provided to aid in installation and alignment of the respective components. In some embodiments, the alignment pin 1213 in the first connector element 1205 may pass completely through the first connector element 1205 to allow for engagement and/or alignment with both the platform 1208 and the second connector element 1207. In some embodiments, the alignment pin 1213 that aligns the platform 1208 and the first connector element 1205 may be a separate component such as a dowel. Further, the alignment pin 1215 that aligns the bearing cartridge 1206 with the second connector element 1207 is shown installed within or as part of a connector head 1217 of the bearing cartridge 1206. However, in other embodiments, this alignment pin 1215 may be installed into the second connector element 1207 and/or as a separate pin or dowel.

Turning now to FIGS. 13A-13B, enlarged, cross-sectional illustrations of an auxiliary multi-axis assembly 1300 in accordance with an embodiment of the present disclosure is shown. The auxiliary multi-axis assembly 1300 may be similar to that shown and described with respect to FIGS. 12A-12C, with a platform 1308 mounted to a releasable connector assembly 1301 which in turn connects to a bearing cartridge 1306. FIG. 13B illustrates a portion of the releasable connector assembly 1301 without a releasable locking element 1303 installed thereto. The releasable connector assembly 1301 includes the releasable locking element 1303 that engages with a first connector element 1305 and a second connector element 1307. As shown, the first connector element 1305 can have a platform 1308 attached thereto and the second connector element 1307 can attach to the bearing cartridge 1306.

A first alignment pin 1313 is provided to enable alignment and connection between the platform 1308 and the first connector element 1305. A second alignment pin 1315 is provided to enable alignment and connection between the second connector element 1307 and the bearing cartridge 1306.

As shown, the first connector element 1305 includes a first contact surface 1319 that is configured to contact and engage with part of the releasable locking element 1303. Similarly, the second connector element 1307 includes a second contact surface 1321 that is configured to contact and engage with part of the releasable locking element 1303. When the first connector element 1305 is positioned and aligned with the second connector element 1307, the releasable locking element 1303 can be positioned to contact and engage with the contact surfaces 1319, 1321 and securely retain the two connector elements 1305, 1307 together. However, when desirable, the releasable locking element 1303 can be disengaged from the connector elements 1305, 1307, and the connector elements 1305, 1307 may be separated (e.g., to change the platform 1308 and/or a target held by the platform 1308).

As will be appreciated in view of the above description, the term "auxiliary axis measurement system" refers to any system with multiple encoders that are housed within different structures (e.g., AACMMs, rotary tables, partial-AACMMs, etc.) that are configured to operate as a single measurement system. Each of the different structures may include one or more encoders to measure movement, rotation, position, etc. For example, some AACMMs may include six or seven encoders, a turntable may include one or two encoders, and a partial AACMM may include a two-axis steering assembly with associated encoders. Thus, the term "auxiliary axis measurement system" of the present disclosure is not to be limiting to any particular arrangement of structures, but rather the teachings here are illustrative and exemplary of various different alternative potential embodiments, without limitation. The encoders of the different structures may be connected through a common bus, with each encoder responsive to a capture signal sent over the bus, to achieve the single measurement system described herein.

Advantageously, embodiments provided herein enable improved scanning of targets, as described above. Increased speed, accuracy, and volume are all achievable with embodiments of the present disclosure, as compared to prior scanning systems and techniques. Further, various embodiments provided here can enable the scanning of objects nearing or exceeding the scanning envelope (i.e., largest extension or extent of the arm segments) of an AACMM.

For example, in one non-limiting application, an automotive door panel was mounted on a "turner" rotary table accessory, linked as an auxiliary axis, to an AACMM to which a laser line probe (triangulation line scanner) was attached. In the application, a compensation procedure was performed to provide the required compensation parameters, as described elsewhere in this application. During the procedure, the 3D measurements of the AACMM were automatically synchronized to the rotational position of the turner. The laser line probe on the AACMM was thereby able to determine 3D coordinates of the door automatically registered in the frame of reference of the AACMM, even as the operator (i.e., user) rotated the door at will. The laser line probe measured the 3D coordinates of the front, back, and sides of the automotive door panel without requiring the operator to remove the automotive door panel and reverse the direction of the automotive door panel in a fixture.

To evaluate the advantages provided by this 3D measurement apparatus and method, for the present illustrative application, the measurement accuracy and speed obtained using the turner attached to the auxiliary axis were compared to the accuracy and speed obtained using a traditional measurement method. Following a traditional measurement method, the automotive door panel was placed on a test fixture, and six magnetic leapfrog targets were placed on the automotive door panel. Each leapfrog target included a spherical target mounted on a shaft. Before and after manually reversing the automotive door panel on the text fixture, the leapfrog targets were measured with the laser line probe on the AACMM. The 3D coordinates of the leapfrog targets were used to obtain a transformation matrix that enabled the measured 3D coordinates to be registered together in a common frame of reference (i.e., before and after rotating the automotive door panel).

According to the specifications provided by the manufacturer, the maximum permissible error (MPE) of the AACMM in this experiment is 32 micrometers when used with a hard probe and 48 micrometers when used with a laser line probe. The auxiliary-axis turner accessory used the same type of angular encoder as found on each axis of the axes of the AACMM. Hence, the error contributed by the turner to the overall measurement accuracy would be expected to be a relatively small fraction of the MPE value of the AACMM. For example, if the turner and the AACMM were mounted in a stable arrangement and properly compensated, it would not be expected that the equivalent MPE value of the measurement, when performed with a laser line probe and the auxiliary-axis turner to exceed 60 micrometers. In contrast, after manually flipping the door in the fixture as done in traditional scanning, the registration error in the experiment was found to have a maximum value of 69 micrometers. Hence we would expect the maximum error of the laser line probe 3D measurements, including re-registration using the leapfrog targets, to be greater than 100 micrometers in most cases. As such, it was determined that an improvement in accuracy of at least 50 percent using an auxiliary-axis system of the present disclosure (instead of leapfrog targets as typically used) may be achieved.

The experimental application showed that the speed of the measurement was improved by using a turner accessory attached to the auxiliary axis. For the experiment performed sequentially on multiple door panels, with processing automatically performed off-line, the time to measure the front of each door panel was found to be 3.5 minutes on the front side and 4 minutes on the back side, for a total measurement time of 7.5 minutes per door panel. These same times were required for the traditional method, but in addition 2 minutes were required to measure the 3D coordinates of the leapfrog targets, and an additional 4 minutes were required to rotate the door on the test fixture and to measure the 3D coordinates of the leapfrog targets a second time. These added steps increased the required measurement time by a 66 percent in this case.

It is noted that using prior techniques, substantial additional time may be required to obtain a complete scan. For example, additional time may be caused by post-processing procedures. Further, additional actions by the user may be required, such as rotating or flipping the target during the scan and/or moving around the target to obtain specific angles or sides of scanning. Further, the target itself may be required to be adjusted during the scanning process (e.g., adjust to obtain all sides of a three dimensional object). Additionally, prior techniques may employ registering of scan data based on natural features, which may require additional imaging and/or scanning instruments, and post processing. In contrast, the present invention allows for real-time data collection and registration based on encoder data, without the need for post-processing to be performed thereon.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. An auxiliary axis measurement system for determining three-dimensional coordinates of an object, the system comprising:
   a primary axes assembly having one or more primary axes, wherein each axis of the one or more primary axes includes an encoder configured to measure movement relative to a respective axis;
   an auxiliary axis assembly having three auxiliary axes, wherein each axis of the three auxiliary axes includes an encoder configured to measure movement relative to a respective axis, wherein the three auxiliary axes comprise a rotatable axis, a tilt axis, and a translation axis; and
   a control unit operably connected to the encoders of the primary axes assembly and the encoders of the auxiliary axis assembly and configured to receive data therefrom, wherein the control unit processes, integrates, and synchronizes the data from both the primary axes assembly and the auxiliary axis assembly in real-time to employ a single coordinate system to determine the three-dimensional coordinates of the object, wherein the control unit corrects, in real-time, for delays of data collection between the encoders based on a capture signal sent from the control unit to each encoder and wherein the collected data is synchronized to the capture signal and data from each encoder is transmitted to the control unit at a capture interval.

2. The auxiliary axis measurement system of claim 1, wherein the primary axes assembly is an articulated arm coordinate measuring machine.

3. The auxiliary axis measurement system of claim 1, wherein the auxiliary axis assembly is a turntable assembly.

4. The auxiliary axis measurement system of claim 3, wherein the turntable assembly includes a removable platform and a releasable connector assembly.

5. The auxiliary axis measurement system of claim 1, wherein the control unit is a component of the primary axes assembly.

6. The auxiliary axis measurement system of claim 1, wherein the primary axes assembly comprises two or more measuring devices, wherein each measuring device includes one or more respective axes.

7. The auxiliary axis measurement system of claim 6, wherein each measuring device is a laser line probe.

8. The auxiliary axis measurement system of claim 6, wherein the auxiliary axis assembly includes a conveyor.

9. The auxiliary axis measurement system of claim 1, further comprising a table, wherein the primary axes assembly and the auxiliary axis assembly are mounted to the table.

10. The auxiliary axis measurement system of claim 9, wherein the control unit is located within the table.

11. The auxiliary axis measurement system of claim 1, wherein the primary axes assembly is operably connected to the control unit by at least one respective communication line and the auxiliary axis assembly is operably connected to the control unit by at least one respective communication line.

12. The auxiliary axis measurement system of claim 11, wherein the respective communication lines of the primary axes assembly and the auxiliary axis assembly form a common bus.

13. The auxiliary axis measurement system of claim 1, wherein the control unit processes the data from the primary axes assembly and the auxiliary axis assembly to generate a 3D measurement of a target.

14. The auxiliary axis measurement system of claim 1, wherein the control unit synchronizes the data from the primary axes assembly and the auxiliary axis assembly to less than 50 nanoseconds.

15. The auxiliary axis measurement system of claim 1, wherein the control unit obtains and processes the data from the primary axes assembly and the auxiliary axis assembly while both the primary axes assembly and the auxiliary axis assembly are moving.

16. The auxiliary axis measurement system of claim 1, wherein the control unit is configured to determine a center of gravity of the object from the data received from the encoders of the auxiliary axis assembly and to aid a user to place the center of gravity of the object on the rotatable axis.

17. A method for operating an auxiliary axis measurement system, the method comprising:
    obtaining data, at a control unit, from a primary axes assembly having one or more primary axes, wherein each axis of the one or more primary axes includes an encoder configured to measure movement relative to the respective axis;
    obtaining data, at the control unit, from an auxiliary axis assembly having three auxiliary axes, wherein each axis of the three auxiliary axes includes an encoder configured to measure movement relative to the respective axis, wherein the three auxiliary axes comprise a rotatable axis, a tilt axis, and a translation axis; and
    processing, integrating, and synchronizing the data from both the primary axes assembly and the auxiliary axis assembly in real-time to employ a single coordinate system to generate 3D coordinate data of a target, wherein the control unit corrects, in real-time, for delays of data collection between the encoders based on a capture signal sent from the control unit to each encoder and wherein the collected data is synchronized to the capture signal and data from each encoder is transmitted to the control unit at a capture interval.

18. The method of claim 17, wherein the primary axes assembly is an articulated arm coordinate measuring machine and the auxiliary axis assembly is a turntable assembly.

19. The method of claim 17, wherein the control unit is a component of the primary axes assembly.

20. The method of claim 17, wherein the control unit synchronizes the data from the primary axes assembly and the auxiliary axis assembly to less than 50 nanoseconds.

21. The method of claim 17, further comprising:
    determining a center of gravity of the target from the data received from the auxiliary axis assembly; and
    aiding a user in placement of the center of gravity of the object on the rotatable axis.

\* \* \* \* \*